(12) United States Patent
Nielsen et al.

(10) Patent No.: US 7,456,524 B2
(45) Date of Patent: Nov. 25, 2008

(54) APPARATUS FOR AND METHODS OF POLYPHASE POWER CONVERSION

(75) Inventors: Henning Roar Nielsen, Brenderup (DK); Thomas E. Hjort, Vejle (DK)

(73) Assignee: American Power Conversion Corporation, West Kingston, RI (US)

( * ) Notice: Subject to any disclaimer, the term of this patent is extended or adjusted under 35 U.S.C. 154(b) by 111 days.

(21) Appl. No.: 11/394,926

(22) Filed: Mar. 31, 2006

(65) Prior Publication Data

US 2007/0228837 A1  Oct. 4, 2007

(51) Int. Cl.
*H02J 3/00* (2006.01)
(52) U.S. Cl. .......................... 307/82; 361/47
(58) Field of Classification Search ............ 307/82; 361/47
See application file for complete search history.

(56) References Cited

U.S. PATENT DOCUMENTS

| | | | | |
|---|---|---|---|---|
| 4,333,119 A | * | 6/1982 | Schoenmeyr | 361/76 |
| 5,311,419 A | * | 5/1994 | Shires | 363/65 |
| 5,406,470 A | * | 4/1995 | Ridley et al. | 363/69 |
| 5,638,264 A | * | 6/1997 | Hayashi et al. | 363/65 |
| 6,317,346 B1 | * | 11/2001 | Early | 363/65 |
| 6,757,185 B2 | | 6/2004 | Rojas Romero | |
| 7,005,759 B2 | * | 2/2006 | Ying et al. | 307/64 |
| 7,012,825 B2 | | 3/2006 | Nielsen | |
| 2003/0090225 A1 | * | 5/2003 | Posma et al. | 318/376 |

FOREIGN PATENT DOCUMENTS

WO  2002060032  8/2002

* cited by examiner

*Primary Examiner*—Michael J Sherry
*Assistant Examiner*—Hal I Kaplan
(74) *Attorney, Agent, or Firm*—Lowrie, Lando & Anastasi, LLP.

(57) ABSTRACT

In one aspect, a polyphase power converter includes an input adapted to couple to a polyphase AC source, a positive DC output, and a negative DC output. The polyphase power converter also includes a first plurality of circuits and a second plurality of circuits. In one embodiment, each of the first plurality of circuits is adapted to receive a plurality of phases of the polyphase AC source and to produce a DC voltage at the positive DC output. Each of the second plurality of circuits is adapted to receive a plurality of phases of the AC source and to produce a DC voltage at the negative DC output. In one embodiment, the polyphase power converter includes a plurality of switching devices and each of the plurality of switching devices is adapted to isolate at least one phase of the polyphase AC source from at least one of the plurality of circuits.

43 Claims, 10 Drawing Sheets

FIG. 1 - PRIOR ART

APPARATUS FOR AND METHODS OF POLYPHASE POWER CONVERSION

BACKGROUND OF INVENTION

1. Field of Invention

At least one embodiment of the invention relates to a polyphase power converter, and in particular, to a power factor corrected polyphase power converter.

2. Discussion of Related Art

Polyphase power converters may be employed to convert a multiphase AC input to a DC output. The DC output is often supplied to a DC bus or link. For example, a polyphase uninterruptible power supply ("UPS") may include a polyphase power converter. The DC bus may connect the output of the polyphase power converter to an input of an inverter which is also included in the UPS. The inverter converts the DC power supplied by the DC bus to a polyphase AC signal at an output of the UPS. The UPS may also include a backup source of DC power (e.g., a battery power source, a DC generator, etc.). As is well known by those of ordinary skill in the art, the output of the UPS can be connected to electrical load to increase the reliability of the power supplied to the load.

Various types of UPS systems may employ polyphase power converters. For example, polyphase power converters may be employed in an on-line UPS that can supply power derived from either or both of a primary source of power and a backup source of power without interruption provided that at least one of the primary power source and the secondary power source is available. Polyphase power converters may also be employed in an off-line UPS system that includes a transfer switch such that there is an interruption in power supplied to the electrical load when primary power is lost unexpectedly.

Polyphase power converters may also be employed to convert multiphase AC power to DC power which is supplied to equipment that operates on DC power. For example, a polyphase power converter may supply DC power to operate DC motors or telecommunications equipment. The polyphase power converter may be integrated into the DC powered equipment, or the converter may be a stand-alone unit with an output connected to the DC equipment.

Such UPSs typically are connected to a polyphase AC input that includes a neutral. Generally, the UPS includes a continuous neutral connection from the UPS input to the UPS output. In many of these known approaches, the batteries that are employed with the UPS are connected to the neutral.

Various polyphase power converters include power factor control to maintain a unity power factor of the power drawn from the AC source. Known power converter topology often includes a number of circuits (e.g., boost circuits) that convert the AC power supplied to the input of the power converter to either a positive DC signal or a negative DC signal. In general, each phase of the polyphase AC source is connected to a single positive boost circuit and a single negative boost circuit. Typically, operation of the boost converters is controlled by pulse width modulation. For example, where the polyphase system is a 3-phase system, each phase is connected both to a positive boost circuit that supplies DC power to the positive DC output and to a negative boost circuit that supplies DC power to the negative DC output. FIG. 1 is a high-level schematic of one such polyphase power converter.

The system of FIG. 1 includes a polyphase AC source 100 (e.g., a utility power source) and a DC source 101 (e.g., a battery power source). The system also includes a power converter 102 which may, for example, be included in a UPS. The power converter 102 of FIG. 1 includes an AC input 106 that includes inputs 106A, 106B, 106C each connected to a phase of the polyphase AC source 100. The AC source 100 may also include a neutral which can be connected to a neutral 112 of the power converter 102 at the AC input 106. The power converter 102 of FIG. 1 also includes a DC input 107 including a positive DC input 109 and a negative DC input 111. In addition, the power converter 102 includes a DC output 115. In the embodiment shown in FIG. 1, the positive DC input 109 is connected to the DC source 101 at a positive DC terminal and the negative DC input 111 is connected to the DC source 101 at a negative DC terminal.

The power converter 102 includes a plurality of circuits 115A, 115B, 117A, 117B, 119A, 119B that convert the AC power supplied by the AC source 100 to DC power which is supplied to either a positive DC bus 108 or a negative DC bus 110 at the DC output 115. When employed in a UPS, each of the positive DC bus 108, the negative DC bus 110, and the neutral 112 can be supplied to further UPS circuitry (e.g., to an inverter) that converts the DC to an AC output voltage at the output of the UPS. Circuitry used to convert the DC to AC is well known to those of skill in the art and is not shown in FIG. 1.

Each phase of the polyphase AC source 100 (e.g., lines L1, L2, L3) is supplied to a positive boost circuit (e.g., boost circuits 115A, 117A, and 119A, respectively) and a negative boost circuit (e.g., boost circuits 115B, 117B, and 119B, respectively). Each boost circuit associated with lines L2, L3 (e.g., boost circuits 117A, 117B, and 119A, 119B, respectively) is substantially identical to those associated with line L1; therefore, a description of the operation of only boost circuits 115A and 115B is provided here. In the embodiment shown in FIG. 1, each of the plurality of circuits 115A, 115B, 117A, 117B, 119A, 119B include a rectifier (e.g., rectifiers 103A, 103B), a capacitor (e.g., capacitors 104A, 104B), a silicon controlled rectifiers ("SCR") (e.g., SCRs 105A, 105B), an inductor (e.g., inductors 116A, 116B), a switching device (e.g., switching devices 118A, 118B), and a diode (e.g., diodes 120A, 120B).

Operation of the circuitry is well-known to those skilled in the art and is described in greater detail, for example, in International Application No. PCT/DK02/00041, filed on Jan. 22, 2002, by American Power Conversion Denmark APS, the disclosure of which is incorporated herein by reference.

Briefly, the two boost converter circuits (e.g., circuits 115A, 115B) are connected to a line (e.g., line L1) to operate during the positive half-cycle of the AC input and the negative half-cycle of the AC input, respectively, of the line to which they are connected. The positive boost converter circuit includes a line input 122A, a DC input 124A and a DC output 126A. The rectifier 103A (e.g., a diode) provides half wave rectification of the voltage and current supplied from the line L1 and conducts current during the positive half-cycles of the AC source. The capacitor 104A may be employed as a filter capacitor to eliminate electrical noise that would otherwise be transmitted from the polyphase power converter to the AC source 100. The inductor 116A is switchably connected to the neutral 112 by the switch 118A to store energy in the inductor during a first period of an operating cycle. In a second period of the operating cycle, the inductor 116A is disconnected from the neutral 112 when the switch 118A is turned off. When the inductor 116A is disconnected from the neutral 112, the energy stored in the inductor is provided to the positive DC bus 108 via a diode 120A. During the period when the inductor 116A is providing energy to the positive DC bus 108, a capacitor 122 is also charged.

During the negative half cycles of the line L1, boost circuit 115B which includes the rectifier 103B operates in a fashion similar to that described for the circuit 115A to provide power to the negative DC bus 110. The rectifier 103B provides half wave rectification of the voltage and current supplied from the line L1 and conducts current during the negative half cycles of the line L1. Each of the remaining boost circuits operate in a similar manner to supply power to the positive DC bus 108 and the negative DC bus 110 during the respective positive and negative half-cycles of each line, for example, where boost circuits 117A and 119A supply power to the positive DC bus 108, and boost circuits 117B and 119B supply power to the negative DC bus 110. Operation of the switches that provide the switching in the boost circuits is provided by control logic that, in general, switches the switches on and off in response to a comparison between a desired input current waveform and the existing input current waveform. Typically, operation of the boost converters is controlled by pulse width modulation. Further, the boost circuits may include power factor control to maintain a unity power factor of the power drawn from the AC source 100.

Power from the DC power source 101 can be supplied to the boost circuits 115A, 115B, 117A, 117B, 119A, 119B either alone or in combination with AC power from the AC source 100. Each boost circuit is connected to the DC source at a DC input (e.g., DC inputs 124A, 124B). Where the UPS includes batteries, for example, a first battery can be configured with a negative battery potential connected to the neutral 112 and a positive battery potential connected to the DC input 124A and from there to the remainder of the boost converter 115A via the silicon controlled rectifier ("SCR") 105A. A second battery can be configured with a positive battery potential connected to the neutral 112 and a negative battery potential connected to the DC input 124B and from there to the remainder of the boost converter 115B via the SCR 105B. As a result, the source of DC power is switchably connected to the boost circuits (e.g., boost circuits 115A, 115B).

The polyphase power converter of FIG. 1 can operate in at least three stages of operation. In a first stage of operation, when the AC source 100 is unavailable, the SCRs (e.g., SCRs 105A, 105B) may be operated to provide a constant level of DC power from the DC source of power 101 to the DC inputs of circuits 115A, 115B, 117A, 117B, 119A, 119B. In a second stage of operation, where the polyphase AC source 100 becomes available the power supplied from the DC source 101 can be gradually decreased (e.g., ramped down) while the power supplied from the polyphase AC source 100 is gradually increased. Here, in the second stage of operation, the SCR (e.g., SCR 105A) only conducts for the period of a DC pulse provided from the DC source of power 101 to the inductor (e.g., inductor 116A). In one embodiment, power is supplied from the polyphase AC source 100 via rectifier (e.g., rectifier 103A) during the period when the SCR (e.g., SCR 105A) is not conducting, i.e., when the SCR is turned off.

In a version of the preceding embodiment, each boost converter circuit draws a sinusoidal half-cycle of current from a line of the polyphase AC source 100 to which it is connected during 180 degrees (i.e., half) of the line cycle. DC power is drawn from the DC source of power 101 during a part of the remaining 180 degrees of the line cycle. Generally, DC power is drawn during less than the full 180 degrees. In one embodiment, DC power is drawn from the DC source of power 101 for 120 degrees of the line cycle. In this embodiment, the total current drawn from either the positive DC source or the negative DC source approaches a constant DC current thereby minimizing battery ripple current.

Provided an overload condition does not exist, in a third stage of operation, the power supplied from the DC source 101 is zero and the electrical demand of any load connected to the DC output 115 is met by power supplied to the boost circuits 115A, 115B, 117A, 117B, 119A, 119B from the polyphase AC source 100. Further, power may also be provided from the DC source 101 to circuits 115A, 115B, 117A, 117B, 119A, 119B when the AC source 100 is available to supplement the AC source, for example, during periods of heavy electrical loading. That is, power from the DC source of power 101 can be used to prevent an overload of the polyphase AC source 100.

Because the rectifier included in each boost circuit is only conducting for one half of the line cycle where each boost circuit is connected to a single line of the polyphase AC source 100, each boost circuit can only draw power from the polyphase AC source 100 for a maximum of 180 degrees of the line cycle.

SUMMARY OF INVENTION

To increase the efficiency and the maximum power rating of polyphase power converters, in one embodiment, at least two of the boost circuits included in the power converter simultaneously draw power from the same phase of a polyphase AC source.

In one aspect, a polyphase power converter includes an input adapted to couple to a polyphase AC source, a positive DC output, and a negative DC output. The polyphase power converter also includes a first plurality of circuits and a second plurality of circuits. In one embodiment, each of the first plurality of circuits is adapted to receive a plurality of phases of the polyphase AC source and to produce a DC voltage at the positive DC output. Each of the second plurality of circuits is adapted to receive a plurality of phases of the AC source and to produce a DC voltage at the negative DC output. In one embodiment, the polyphase power converter includes a plurality of switching devices and each of the plurality of switching devices is adapted to isolate at least one phase of the polyphase AC source from at least one of the plurality of circuits.

According to one embodiment, each of the first plurality of circuits is adapted to receive a different combination of phases than others of the first plurality of circuits and each of the second plurality of circuits is adapted to receive a different combination of phases than others of the second plurality of circuits.

According to another embodiment, the first plurality of circuits include means for receiving a plurality of phases of the polyphase AC source and the second plurality of circuits include means for receiving a plurality of phases of the polyphase AC source. In a further embodiment, each of the first plurality of circuits and each of the second plurality of circuits include a separate boost circuit and the means include switching means adapted to isolate at least one phase of the polyphase AC source from at least one of the plurality of circuits among the first plurality of circuits and the second plurality of circuits.

In another aspect, a polyphase AC input is converted to a DC output where a first power converter circuit is coupled to a first combination of phases of the polyphase AC input and second power converter circuit is coupled to a second combination of phases of the polyphase AC input. Further, an output of the first power converter circuit is coupled to the DC output and an output of the second power converter circuit is also coupled to the DC output. According to one embodiment, a first phase of the polyphase AC source is isolated from the first power converter circuit with a first switching device and a second phase of the polyphase AC source is isolated from the second power converter circuit with a second switching device. In a version of this embodiment, the first switching device is a first controlled rectifier and the second switching device is a second controlled rectifier. In a further embodiment, power is simultaneously drawn from a phase of the polyphase AC input by both the first power converter circuit and the second power converter circuit for at least a part of the line cycle of the polyphase AC input.

According to another aspect, a polyphase UPS includes a first input adapted to couple to a polyphase AC source, a positive DC output, and a negative DC output. In one embodiment, the UPS includes a plurality of positive boost circuits each adapted to receive a plurality of phases of the polyphase AC source and to provide a DC signal to the positive DC output, and a plurality of negative boost circuits each adapted to receive a plurality of phases of the polyphase AC source and to provide a DC signal to the negative DC output. The UPS also includes a second input adapted to be coupled to a DC power source.

According to one embodiment, the UPS also includes a neutral output and an inverter where the positive DC output, the negative DC output, and the neutral output are adapted to be coupled to the inverter. According to another embodiment, each of the boost circuits include a first input adapted to receive a rectified signal from a first phase of the polyphase AC source, and a second input adapted to receive a rectified signal from a second phase of the polyphase AC source.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
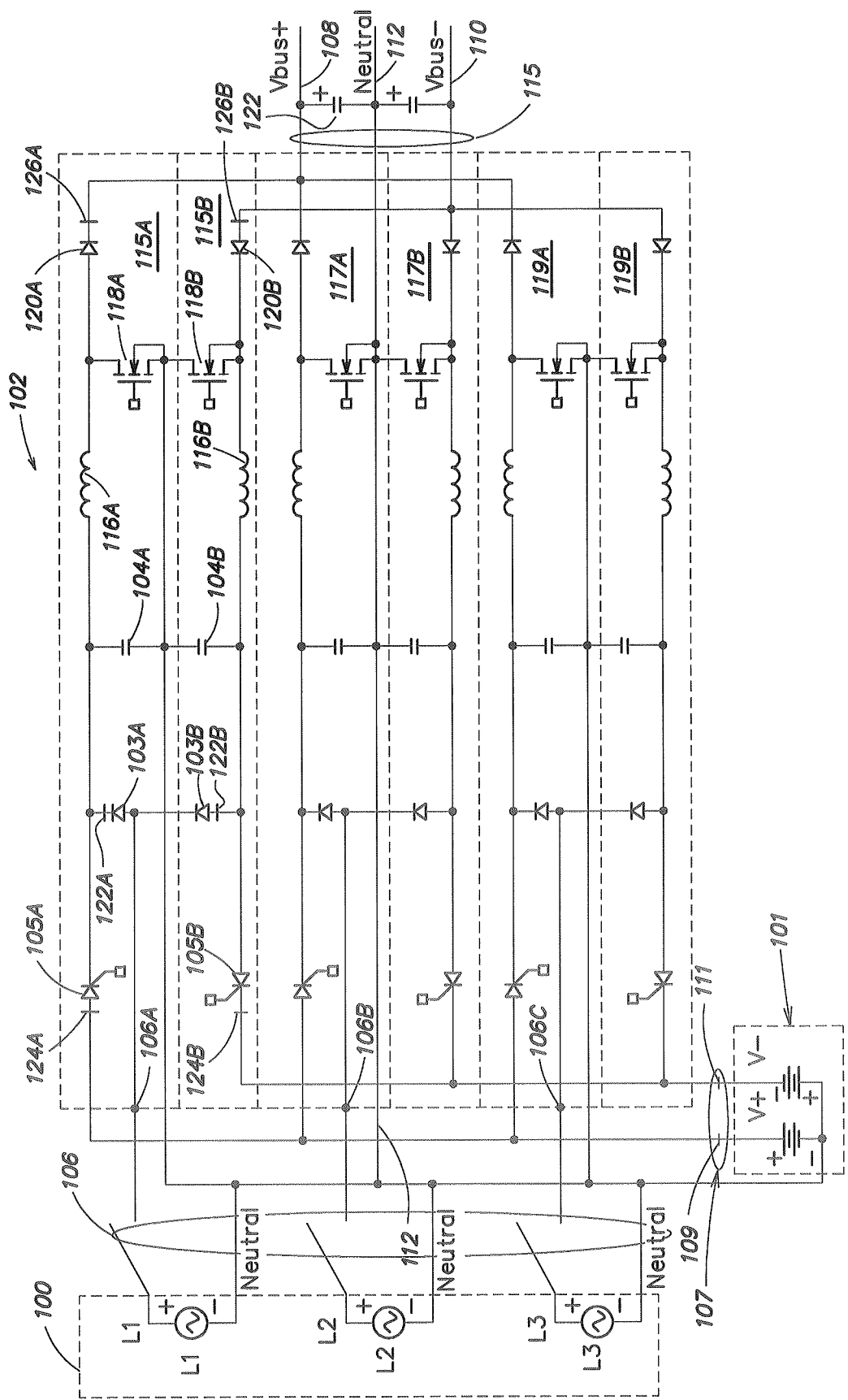
FIG. 1 is a schematic diagram of a prior art power converter.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
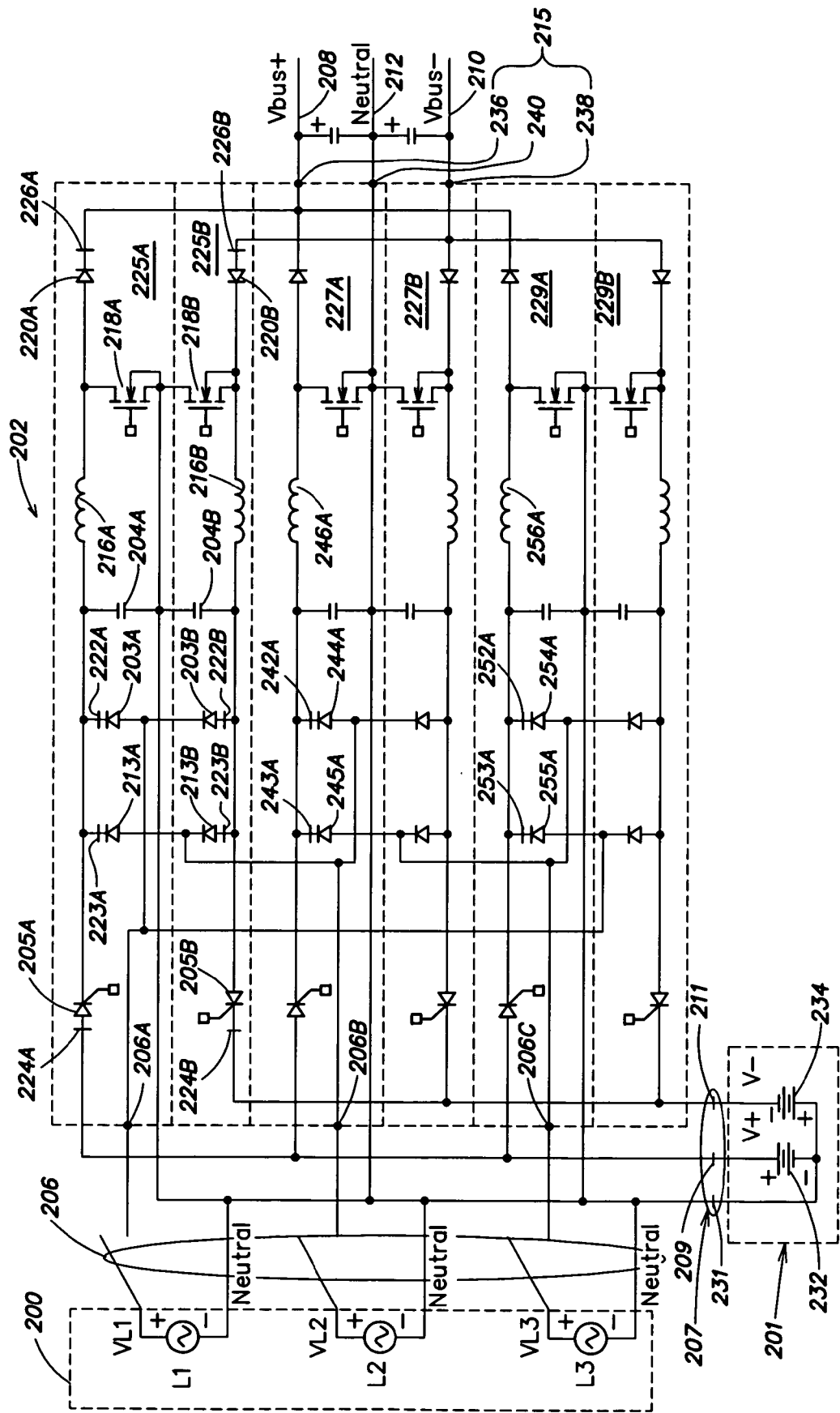
FIG. 2 is a schematic diagram of a power converter in accordance with one embodiment of the invention.

FIG. 2 illustrates a polyphase power converter 202 according to an embodiment of the invention. In one embodiment, the polyphase power converter 202 includes a plurality of circuits 225A, 225B, 227A, 227B, 229A, 229B each connected to a plurality of phases of a polyphase AC source 200. As a result, each of the plurality of circuits 225A, 225B, 227A, 227B, 229A, 229B can draw power from a plurality of phases of the polyphase AC source 200. In one or more embodiments, each of the plurality of circuits 225A, 225B, 227A, 227B, 229A, 229B operates during a part of the line cycle of two or more phases of the polyphase AC source to increase the percentage of time that the circuit (e.g., 225A, 225B) supplies power to the DC output to which it is connected. Further, in one embodiment, two or more circuits 225A, 225B, 227A, 227B, 229A, 229B simultaneously draw current from the same phase of the polyphase AC source 200. That is, two or more circuits operate in parallel during a part of a line cycle. This provides an approach where current waveforms drawn by each circuit (e.g., the circuit 225A) have lower RMS values than the RMS values of current waveforms found in prior approaches. Accordingly, embodiments of the invention provide lower losses than prior approaches. Thus, the polyphase power converter 202 of FIG. 2 operates with higher efficiency than previously known approaches.

The polyphase power converter 202 includes an AC input 206 that includes inputs 206A, 206B, 206C each connected to a phase of the polyphase AC source 200. The AC input 206 may also include a neutral input connected to the neutral 212. The polyphase power converter 202 of FIG. 2 also includes a DC input 207 and a DC output 215. The DC input 207 can include a positive DC input 209, a negative DC input 211, and a neutral input 231. The DC input 207 is connected to a DC power source 201. In a version of this embodiment, the positive DC input 209 is connected to the DC power source 201 at a positive DC terminal and the negative DC input 211 is connected to the DC power source 201 at a negative DC terminal. In the embodiment illustrated in FIG. 2, the DC power source 201 includes a first battery 232 and a second battery 234.

The DC output 215 can include a positive DC output 236, a negative DC output 238, and a neutral output 240. In one embodiment, the positive DC output 236 is connected to a positive DC bus 208, the negative DC output 238 is connected to a negative DC bus 210, and the neutral output 240 is connected to a neutral 212.

In accordance with one embodiment, the polyphase power converter 202 includes both a plurality of circuits (e.g., 225A, 227A, 229A) that include positive boost circuits and a plurality of circuits (e.g., 225B, 227B, 229B) that include negative boost circuits. Further, in one embodiment, a positive boost circuit and a corresponding negative boost circuit (e.g., circuits 225A and 225B) are connected to a plurality of the phases, and in particular, they can be connected to the same phases of the polyphase AC source 200. In one version of this embodiment, the polyphase AC power converter 202 includes a plurality of pairs of boost circuits (e.g., 225A/225B, 227A/227B, 229A/229B) where each circuit in a pair is connected to the same phases. That is, in one embodiment, each of the circuits 225A, 225B are connected to a first phase and a second phase (i.e., lines L1, L2), each of the circuits 227A, 227B are connected to the second phase and a third phase (i.e., lines L2, L3), and each of the circuits 229A, 229B are connected to the first phase and the third phase (i.e., lines L1, L3).

According to one embodiment, each of the boost circuits is connected to lines of the polyphase AC source 200 at line inputs. For example, the circuit 225A includes a first line input 222A and a second line input 223A and the circuit 225B includes a first line input 222B and a second line input 223B.

In one embodiment, the polyphase AC source 200 is a three-phase source (i.e., with lines L1, L2, L3) where the first line inputs 222A, 222B of each of the circuits 225A, 225B, respectively, are connected to line L1 and the second line inputs 223A, 223B of each of the circuits 225A, 225B, respectively, are connected to line L2. Each of the first line inputs of the circuits 227A, 227B can be connected to the line L2 while each of the second line inputs of the circuits 227A, 227B can be connected to the line L3. Further, each of the first line inputs of the circuits 229A, 229B can be connected to the line L3 while each of the second line inputs of the circuits 229A, 229B can be connected to the line L1. As illustrated in FIG. 2, in one embodiment, each line input (e.g., the line input 222A) is connected to the corresponding line through a rectifier (e.g., a first rectifier 203A).

Other configurations can be employed for any polyphase AC source 200 that includes any number of phases to draw a power factor corrected current from each phase of the polyphase AC source 200.

In one embodiment, the circuit 225A also includes a DC input 224A, a DC output 226A, a first rectifier 203A, a second rectifier 213A, a silicon controlled rectifier ("SCR") 205A, a capacitor 204A, an inductor 216A, a switch 218A, and a diode 220A. Each of the remaining circuits 227A, 229A are configured similarly.

In one embodiment, the circuit 225B also includes a DC input 224B, a DC output 226B, a first rectifier 203B, a second rectifier 213B, a SCR 205B, a capacitor 204B, an inductor 216B, a switch 218B and a diode 220B. Each of the remaining circuits 227B, 229B are configured similarly.

In one embodiment, the circuit 225A which includes a positive boost circuit is configured as follows: a first phase of the polyphase AC source is connected to an anode of the rectifier 203A; a cathode of the rectifier 203A is connected to the first line input 222A; a second phase of the polyphase AC source is connected to an anode of the rectifier 213A; a cathode of the rectifier 213A is connected to the second line input 223A; an anode of the SCR 205A is connected to the DC input 224A which is connected to the positive DC input 209 of the polyphase power converter 202; a cathode of the SCR 205A, the first line input 222A, the second line input 223A, and a terminal of the capacitor 204A are connected at the input side of the inductor 216A; a second terminal of the capacitor 204A is connected to the neutral 212; the output side of the inductor 216A is connected to a first terminal of the switch 218A and to an anode of the diode 220A; a second terminal of the switch 218A is connected to the neutral 212; a cathode of the diode 220A is connected to the positive DC output 226A which is connected to the DC output 215 of the polyphase power converter 202 at the positive DC output 236.

Each of the additional circuits included in the polyphase power converter 202 that include a positive boost circuit (i.e., the circuits 227A, 229A) are configured similar to the circuit 225A, however, they are not connected to the same combination of phases of the polyphase AC source 200 as is the circuit 225A. For example, referring to the remaining two circuits (i.e., circuits 227A, 229A) that include a positive boost circuit, the circuit 227A includes an inductor 246A, a first line input 242A, a second line input 243A, a first rectifier 244A and a second rectifier 245A. In one embodiment, an anode of the first rectifier 244A is connected to a first phase of the polyphase AC source 200; a cathode of the first rectifier 244A is connected to the first line input 242A; an anode of the second rectifier 245A is connected to the second phase of the polyphase AC source 200; a cathode of the second rectifier 245A is connected to the second line input 243A; and each of the first line input 242A and the second line input 243A are connected to the input side of the inductor 246A.

The circuit 229A includes an inductor 256A, a first line input 252A, a second line input 253A, a first rectifier 254A, and a second rectifier 255A. In one embodiment, an anode of the first rectifier 254A is connected to a first phase of the polyphase AC source 200, a cathode of the first rectifier 254A is connected to the first line input 252A, an anode of the second rectifier 255A is connected to a second phase of the polyphase AC source 200, a cathode of the second rectifier 255A is connected to the second line input 253A, and the first line input 252A and the second line input 253A are connected to an input side of the inductor 256A.

In one embodiment, the circuit 225B which includes a negative boost circuit is configured as follows: a first phase of the polyphase AC source 200 is connected to a cathode of the first rectifier 203B; an anode of the first rectifier 203B is connected to the first line input 222B; a second phase of the polyphase AC source 200 is connected to a cathode of the second rectifier 213B; an anode of the second rectifier 213B is connected to the second line input 223B; a cathode of the SCR 205B is connected to the DC input 224B which is connected to the negative DC input 211 of the polyphase power converter 202; an anode of the SCR 205B, the first line input 222B, the second line input 223B, and a terminal of the capacitor 204B are connected at the input side of the inductor 216B; a second terminal of the capacitor 204B is connected to the neutral 212; the output side of the inductor 216B is connected to a first terminal of the switch and to the cathode of the diode 220B; a second terminal of the switch is connected to the neutral 212; an anode of the diode 220B is connected to the negative DC output 226B which is connected to the DC output 215 of the polyphase power converter 202 at the negative DC output 238.

Each of the additional circuits that include a negative boost circuit (i.e., the circuits 227B, 229B) are connected in a manner similar to the connections described for circuit 225B, however, they are not connected to the same combination of phases of the polyphase AC source 200 as is the circuit 225B.

According to one embodiment, each of the plurality of circuits 225A, 225B, 227A, 227B, 229A, 229B includes at least three operating sections that are employed together. One operating section controls the DC current drawn at the DC input 224A. This operating section includes the SCR (e.g., the SCR 205A) which can be switched on and off to control the current drawn from the DC power source 201. Another operating section includes the rectifier portion of the circuit which, in one embodiment, converts the sinusoidal AC signal supplied by the polyphase AC source 200 to a half-wave rectified signal at the line inputs (e.g., the first and second line inputs 222A, 223A). A third operating section includes the boost circuit that receives the AC current at one of the first line input (e.g., first line input 222A) and the second line input (e.g., the second line input 223A) and provides a DC signal at the DC output (e.g., the DC output 226A).

The operation of the circuits is controlled by a controller which may include an electronic control circuit which may be an analog circuit, a digital circuit, or a combination of analog and digital circuits. In one embodiment, the controller includes at least one digital signal processor (e.g., a microprocessor). Further, a single controller or a plurality of controllers may be used to control the operation of the plurality of circuits 225A, 225B, 227A, 227B, 229A, 229B. For example, in one embodiment, a separate controller may be used to separately control each of the circuits 225A, 225B, 227A, 227B, 229A, 229B.

At least one sensor (e.g., a current sensor) is included with each of the plurality of circuits 225A, 225B, 227A, 227B, 229A, 229B to provide a signal indicative of the actual current being drawn by the circuit. The controller uses the information provided by the sensor to generate one or more switching signals that control the operation of the switches included in the circuit, for example, the SCR 205A and the switch 218A included in the circuit 225A. According to one embodiment, the controller compares the actual current with a reference waveform and controls the operation of the switches in the circuit to closely match the actual current drawn to the reference waveform.

In general, the controller controls operation of the circuits 225A, 225B, 227A, 227B, 229A, 229B so that they draw a substantially sinusoidal current from the polyphase AC source 200 at a substantially unity power factor. During operation on the DC power source 201, the controller controls the circuits to boost the voltage supplied by the DC power source 201.

The operation of the circuits connected to the positive DC output 236 (e.g., the circuits 225A, 227A, 229A) is described below, however, the circuits connected to the negative DC output 238 (e.g., boost circuits 225B, 227B, 229B) operate in a similar fashion.

Figure 3A:
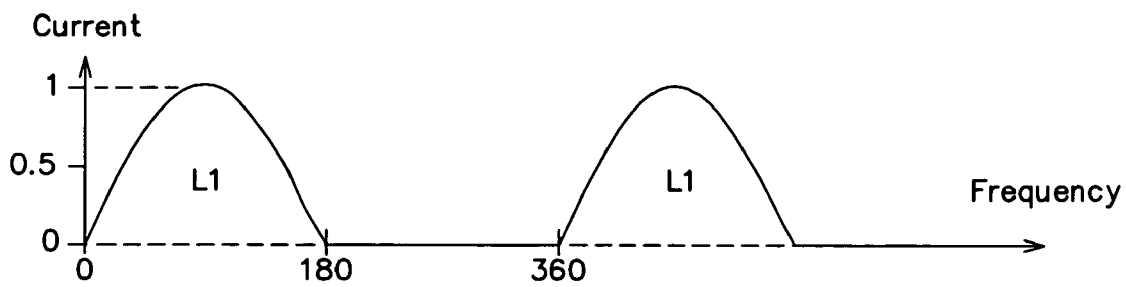
FIG. 3A illustrates a plot of the current drawn by a prior art boost circuit.

Existing power converter topologies do not fully utilize the power available from the polyphase AC source 100. That is, known polyphase power converters do not operate as efficiently as possible. FIG. 3A depicts the current waveform at an input to a prior art boost converter. As illustrated in FIG. 3A, a positive boost circuit which is only connected to a single phase only draws current during the period where the instantaneous voltage in the line is positive, for example, during positive half cycles of the line L1. Similarly, in prior art power converters, a negative boost circuit only connected to a single phase only draws current during the period which is where the instantaneous voltage in the line is negative.

Separate boost circuits connected to the remaining phases of the polyphase AC source operate similarly in prior art power converters. That is, for a three phase AC source, one positive boost circuit operates during the period when the instantaneous voltage in line L2 is positive and another positive boost circuit operates during the period that occurs when the instantaneous voltage in line L3 is positive. Similarly, one negative boost circuit operates during the period when the instantaneous voltage in line L2 is negative and another negative boost circuit operates during a period when the instantaneous voltage in line L3 is negative.

For the purpose of explaining the operation of embodiments of the invention, the operation of the polyphase power converter 202 connected to a three-phase AC source with lines L1, L2, and L3 is described. In addition, the following description refers to a symmetrical three-phase system that includes a balanced load and a 120 degree phase displacement between the lines L1, L2, and L3. Embodiments of the invention can be employed in non-symmetrical systems with unbalanced loading.

Figure 4:
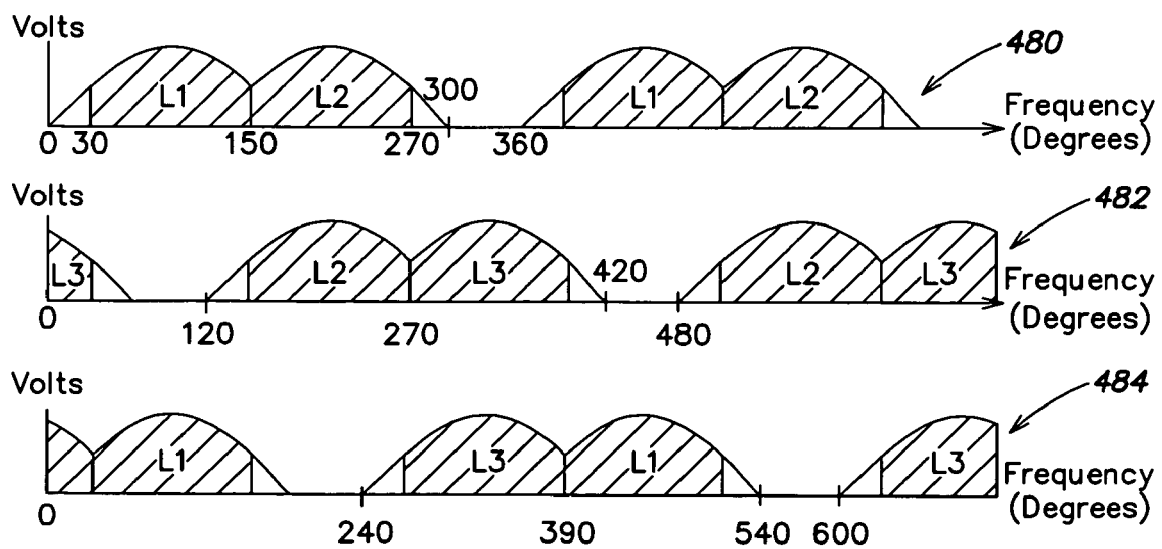
FIG. 4 illustrates a plot of the voltage at a line input of a circuit employed in a polyphase power converter in accordance with embodiments of the invention.

Referring to FIG. 4, three waveform-plots are shown. The x-axis of each plot provides a reference for each of the plots beginning at the point where the voltage of line L1 of the polyphase AC source 200 goes through a positive zero crossing (this is referred to as zero degrees for purposes of the immediately following description). Thus, the x-axis is labeled with the phase angle of line L1. The waveforms associated with lines L2 and L3 are also plotted with reference to the above-mentioned zero crossing. With the positive zero crossing of line L1 at 0 degrees: the voltage on line L1 is positive at 0-180 degrees and 360-540 degrees; the voltage on line 2 is positive at 120-300 degrees and 480-660 degrees; the voltage on line 3 is positive at 240-420 degrees and 600-780 degrees.

In addition, the unit of time corresponding to a full cycle depends on the line frequency of the polyphase AC source 200. For example, where the polyphase AC source operates at 60 cycles/second, each line cycle is approximately 17 milliseconds.

The first waveform 480 illustrates the voltage present at the input side of the inductor 216A of the circuit 225A which is supplied from the first line input 222A (line L1) and the second line input 223A (line L2), respectively. The second waveform 482 illustrates the voltage present at the input side of the inductor 246A in the circuit 227A which is supplied from the first line input 242A (line L2) and the second line input 243A (line L3) of the circuit 227A, respectively. The third waveform 484 illustrates the voltage present at the input side of the inductor 256A in the circuit 229A which is supplied from the first line input 252A (line L3) and the second line input 253A (line L1), respectively.

According to one embodiment, the circuit 225A operates as shown in waveform-plot 480. At 0-150 degrees, the rectifier 203A is conducting and consequently the positive voltage present on line L1 appears at the first line input 222A of the circuit 225A, i.e., the positive voltage is supplied to the boost circuit included in the circuit 225A. Although line L2 first becomes positive at 120 degrees, its magnitude remains less than the magnitude on line L1 until 150 degrees is reached. At 150 degrees (i.e., the point where the instantaneous voltage of line L2 exceeds the instantaneous voltage of line L1), the rectifier 203A stops conducting and the rectifier 213A begins conducting. As a result, the positive voltage present on line L2 appears at the second line input 223A where it is supplied to the input side of the inductor 216A. That is, at 150 degrees, the boost circuit included in the circuit 225A stops drawing current from line L1 and begins drawing current from line L2. Then, at 300 degrees, the circuit 225A stops drawing current from the polyphase AC source 200 because neither the voltage of the line L1 nor the voltage of the line L2 are positive. Both the rectifiers 203A and 213A remain off until the next positive zero crossing of the line L1 which occurs at 360 degrees. According to one embodiment, at 360 degrees, the above-described sequence of operation begins again.

Similar operating sequences occur for each of the two remaining circuits (i.e., the circuits 227A, 229A) that supply power to the positive DC output 236. For example, the operation of the circuit 227A is now described with reference to the waveform-plot 482. Here, the lines L2 and L3 to which the circuit 227A is connected are plotted over time. The first positive zero crossing of the line L2 that appears in the waveform-plot 482 occurs at 120 degrees. In the interest of clarity, this description begins at that point in time. At 120-270 degrees, the rectifier 244A is conducting and the positive voltage present on line L2 appears at the first line input 242A of the circuit 227A where it is supplied to the input side of the inductor 246A, i.e., it is supplied to the boost circuit included in the circuit 227A.

At 270 degrees (i.e., the point where the instantaneous voltage of line L3 exceeds the instantaneous voltage of line L2), the rectifier 244A stops conducting and the rectifier 245A begins conducting. As a result, the positive voltage present on line L3 appears at the second line input 243A where it is supplied to the input side of the inductor 246A. That is, at 270 degrees, the boost circuit included in the circuit 227A stops drawing current from line L2 and begins drawing current from line L3. Then, at 420 degrees, the circuit 227A stops drawing current from the polyphase AC source 200 because neither the voltage of the line L2 nor the voltage of the line L3 are positive. Both the rectifiers 244A and 245A remain off until the next positive zero crossing of the line L2 which occurs at 480 degrees. According to one embodiment, at 480 degrees, the above-described sequence of operation begins again.

The operation of the third circuit (i.e., the circuit 229A) that supplies power to the positive DC output 236 is now described with reference to the waveform-plot 484. Here, the lines L3 and L1 to which the circuit 229A is connected are plotted over time. The first positive zero crossing of the line L3 that appears in the waveform-plot 484 occurs at 240 degrees. In the interest of clarity again, this description begins at that point in time. At 240-390 degrees, the rectifier 254A conducts and the positive voltage present on line L3 appears at the first line input 252A of the circuit 229A where it is supplied to the input side of the inductor 256A, i.e., it is supplied to the boost circuit included in the circuit 229A.

The magnitude of the positive waveform associated with the line L1 increases beginning at 360 degrees and at 390 degrees (i.e., the point where the instantaneous voltage of line L1 exceeds the instantaneous voltage of line L3), the rectifier 254A stops conducting and the rectifier 255A begins conducting. As a result, the positive voltage present on line L1 appears at the second line input 253A where it is supplied to the input side of the inductor 256A. That is, at 390 degrees, the boost circuit included in the circuit 229A stops drawing current from line L3 and begins drawing current from line L1. Then, at 540 degrees, the circuit 229A stops drawing current from the polyphase AC source 200 because neither the line L3 nor the line L1 have a positive instantaneous voltage. Both the rectifiers 254A and 255A remain off until the next positive zero crossing of the line L3 which occurs at 600 degrees. According to one embodiment, at 600 degrees, the above-described sequence of operation begins again.

As shown in FIG. 4, in one embodiment the connection of a plurality of phases to each of the circuits 225A, 227A, and 229A allows the operation of each boost circuit for all but 60 degrees of a possible 360 degrees of every cycle of the polyphase AC source 200. For example, the boost circuit included in the circuit 225A operates during the first 300 degrees of the cycle occurring from 0-360 degrees.

In addition, according to one embodiment of the polyphase power converter 202, two of the three circuits 225A, 227A, 229A simultaneously draw power from a single phase of the polyphase AC source 200. These regions are represented by the shaded areas that appear in FIG. 4. For example, during the period 30-150 degrees, power is drawn from line L1 by both the circuit 225A and the circuit 229A as shown in the waveform-plot 480 and the waveform-plot 484, respectively.

Similarly, during the period 150-270 degrees power is drawn from the line L2 by both the circuit 225A and the circuit 227A as shown in the waveform-plot 480 and the waveform-plot 482, respectively. In addition, during the period from 270 degrees to 390 degrees power is drawn from the line L3 by both the circuit 227A and the circuit 229A as shown in the waveform-plot 482 and the waveform-plot 484, respectively.

The circuits 225B, 227B, 229B collectively operate during the negative periods of the voltage waveform of the lines L1, L2, L3 in a manner similar to that described above for their counterpart circuits 225A, 227A, 229, respectively. That is, the circuits 225B, 227B, 229B each draw power from a plurality of phases of the polyphase AC source, and two or more of the circuits 225B, 227B, 229B may operate to draw power from the same lines during some periods of operation. In one embodiment, two or more of the circuits 225B, 227B, 229B operate to draw power from the same line during the majority of an operating period, e.g., for greater than 180 degrees of a cycle of the polyphase AC source 200.

Figure 3B:
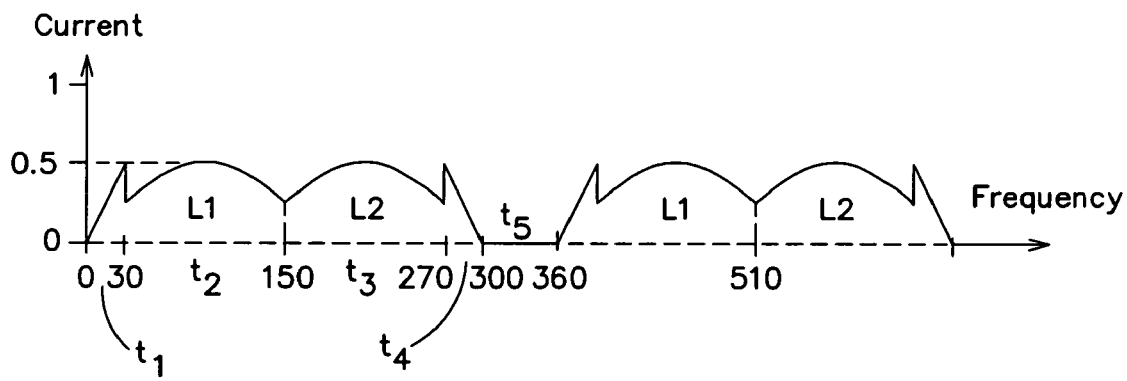
FIG. 3B illustrates a plot of the current drawn by a boost circuit in accordance with an embodiment of the invention.

Referring now to FIG. 3B, the current drawn by the circuit 225A is illustrated in accordance with one embodiment of the invention. For purposes of comparison, the magnitude of the current waveforms illustrated in FIG. 3B and those illustrated in FIGS. 8 and 9 (referred to below) are normalized relative to current illustrated in FIG. 3A. Because the current drawn from the polyphase AC source 200 should include low total harmonic distortion and should be drawn at a substantially unity power factor, the current control of the polyphase power converter 202 should account for periods of operation where current is simultaneously drawn, for example, from the line L1 by the circuit 225A and the circuit 229A, the line L2 by the circuit 225A and the circuit 227A, or from the line L3 by the circuit 227A and the circuit 229A. In one embodiment, the polyphase power converter 202 maintains substantially unity power factor and draws a total current from a phase of the polyphase AC converter with two or more of the circuits 225A, 225B, 227A, 227B, 229A, 229B where the current is in phase with the line voltage and has a waveform with a relatively low total harmonic distortion ("THD"). According to one embodiment, the THD of the current waveform is less than 5%.

FIG. 3B illustrates an approach to maintaining a substantially unity power factor with an embodiment of the polyphase power converter 202 by adjusting the magnitude of the current drawn by one or more circuits. The x-axis in FIG. 3B is split in a plurality of periods with reference to the phase angle of a first phase, i.e., line L1. In accordance with one embodiment, each circuit 225A, 227A, 229A operates during four periods, a first period t1, a second period t2, a third period t3 and a fourth period t4 during a full cycle. In one embodiment, with reference to the circuit 225A, the four periods t1, t2, t3, and t4 all occur when the line L1 and/or the line L2 have a positive instantaneous voltage.

In FIG. 3B, the period t1 occurs when the line L1 has a positive instantaneous voltage that is less than the instantaneous voltage of the line L3 and the line L2 has a negative instantaneous voltage. (The period t1 corresponds to 0-30 degrees in waveform-plot 484.) As a result, only the circuit 225A draws current from the line L1 during the period t1. That is, the other circuit connected to L1 (i.e., the circuit 229A) does not draw current from the line L1. Thus, during the period t1, the current drawn by the circuit 225A need not be adjusted to account for the current drawn from line L1 by another of the circuits 227A, 229A.

Referring again to the waveform-plot 484 in FIG. 4, the line L1 has an instantaneous voltage greater than the instantaneous voltage of both line 2 and line 3 during the period t2.

Consequently, the circuit 225A and the circuit 229A both draw current from line L1 during the period that corresponds to period t2 in FIG. 3B. Accordingly, in one embodiment, the current drawn by each of the circuits 225A and 229A is adjusted during the period t2 to maintain a unity power factor.

The current waveform in FIG. 3B reflects an embodiment of one approach to adjust the current drawn by one or more boost circuits. Here, current drawn from the line L1 at a unity power factor is split between each of the circuits 225A and 229A. This approach effectively reduces the peak current and the RMS current drawn by the circuits 225A and 229A during the period t2.

The above-described approach can be applied to the current drawn from any phase of the polyphase AC source. Therefore, during the period t3 during which current is drawn from line L2 by both the circuits 225A and 227A, the magnitude of the current drawn from line L2 is also split between the two circuits.

The period t4 represents the final 30 degrees (i.e., at 270-300 degrees shown in FIG. 4) for which the circuit 225A supplies power to the positive DC output 236 during the line cycle. Here, the instantaneous voltage of the line L2 is less than the instantaneous voltage of line L3 but greater than the instantaneous voltage of line L1; therefore, only the circuit 225A draws current from line L2 during the period t4. Thus, during the period t4, no adjustment to the current drawn by the circuit 225A is necessary to maintain a substantially unity power factor.

The period t5 represents the period when the circuit 225A is not drawing current from the polyphase AC source 200, i.e., the period corresponding to 300-360 degrees illustrated in the waveform-plot 480 illustrated in FIG. 4.

Because the circuits (e.g., circuits 225B, 227B, 229B) that supply power to the negative DC output 238 can operate in parallel during the negative periods of the line voltages occurring on the lines L1, L2 and L3 in a fashion similar to that described above for the circuits 225A, 227A, 229A, the current waveforms that are drawn during the negative periods of the line voltages will generally appear as shown in FIG. 3B except that they will have a negative polarity and will be shifted in time by one-half cycle relative to the positive current waveform.

According to one embodiment, one or more controllers that control the operation of the circuits 225A, 225B, 227A, 227B, 229A, 229B operate(s) to control the current drawn by the circuits as described above. In a version of this embodiment, the controller includes a digital signal processor.

In one embodiment, the RMS current drawn by each circuit is reduced to 72.8% of the RMS current that would be drawn using the prior approach, e.g., operating each boost converter circuit to draw current from a single phase alone and for a shorter period of time each cycle, for example, as shown in FIG. 3A. Further, in one embodiment of the invention, the peak current is reduced by 50% when compared with the prior approach where only a single boost converter draws current from a line at any one time.

Because the circuits 225A, 225B, 227A, 227B, 229A, 229B operate for a larger percentage of time each cycle as compared with prior art designs, embodiments of the invention provide lower peak and RMS currents. As a result of the lower peak and RMS currents, in one or more embodiments, the power output of the polyphase power converter 202 can be substantially increased when compared with prior polyphase power converters. For example, in one embodiment, the power output can be increased approximately 37% when compared with prior power converters.

Further benefits may result from one or more embodiments of the invention because the peak current seen by the inductors (e.g., inductor 216A) is an important consideration in the rating and design of the inductors employed in the circuits (e.g., circuit 225A). As one example, the amount of peak energy stored by the inductors is proportional to a square of the current in the inductor. In addition, the size and weight of the core of each inductor is directly proportional to the peak energy stored by the inductor. Therefore, in one embodiment, where the peak current is reduced by a factor of two, the peak energy stored by the inductor is reduced by a factor of four. As a result of the reduction in peak energy, in a version of this embodiment, the size and weight of the core of each inductor is also reduced by a factor of four. In another embodiment, the size and weight of the core of the inductors employed in the boost circuits are reduced between two and four times when compared with inductors employed in known polyphase power converters.

Although as described thus far the current drawn in parallel from the same line by two circuits (e.g., the current drawn from line L1 by the circuits 225A and 229A during the period from 30 degrees to 150 degrees) is split evenly between the two circuits, other embodiments may split the current unequally in any amount provided that the sum of the current drawn by the two circuits operating in parallel equals the current that would be provided by a single circuit operating alone to supply power to the DC output from the line at a substantially unity power factor.

According to one embodiment, a fixed frequency current control is included for each of the circuits 225A, 225B, 227A, 227B, 229A, 229B to reduce the amount of the electrical noise that may otherwise be transmitted to the AC input 206 of the polyphase power converter 202 and the polyphase AC source 200. In a version of this embodiment, a fixed frequency of 40 kHz is employed. In one embodiment, the circuits (e.g., circuits 225A, 227A) that draw current in parallel from a phase of the polyphase AC source 200 (e.g., the line L2) operate on phase shifted pulse width modulation carrier signals every other cycle. As a result, the current ripple created by the first circuit (e.g., circuit 225A) and the second circuit (e.g., circuit 227A) are substantially equal and out of phase by 180 degrees; therefore, the current ripple of the first circuit and the second circuit are substantially canceled. In a version of this embodiment, the remaining noise that is not canceled has a reduced amplitude and occurs at higher frequencies where, for example, the capacitors (e.g., capacitor 204A) have higher attenuation. Thus, the amount of noise reflected back to the polyphase AC source 200 is reduced.

Thus far the operation of the polyphase power converter 202 has been described with the converter drawing current solely from the polyphase AC source, however, the polyphase power converter 202 may also draw power from the DC power source 201 either alone or in combination with power being drawn from the polyphase AC power source 202.

In one embodiment, the polyphase power converter 202 draws power from the DC power source 201 when the polyphase AC source 200 is unavailable. In another embodiment, the polyphase power converter 202 also draws power from the DC power source 201 during the period when the amount of current drawn from the polyphase AC source is being adjusted, e.g., increased or decreased. In addition, in versions of each of the preceding embodiments, the polyphase power converter 202 draws power from the DC power source 201 during periods when the polyphase AC source would otherwise be overloaded as a result of the power demand placed on the polyphase power converter 202.

As mentioned above, in one embodiment, DC can be drawn from a DC power source to supplement the power drawn from an AC power source during the periods of the AC line cycle when power is not being drawn from the AC power source. That is, DC power can be drawn from the DC power source during the period of 180 degrees, for example, when a boost circuit is not drawing power from the polyphase AC source. As shown in FIG. 3B, however, in an embodiment of the polyphase power converter 202 of FIG. 2, each circuit 225A, 225B, 227A, 227B, 229A, 229B draws power from the polyphase AC source 200 for 300 degrees out of 360 degrees of each line cycle. As a result, in one embodiment, the amplitudes of the DC current pulses drawn by the circuits 225A, 225B, 227A, 227B, 229A, 229B during the periods when AC current is not being drawn are greater than the DC current pulses drawn by known boost circuits. This approach can allow a shorter duration DC current pulse to provide a substantially equal amount of energy as a longer duration DC current pulse having a smaller amplitude. Because it may be advantageous, however, to employ a DC pulse with a relatively lower magnitude, embodiments of the invention can also include an operating stage that allows the use of a relatively lower magnitude DC current pulse.

Figure 5:
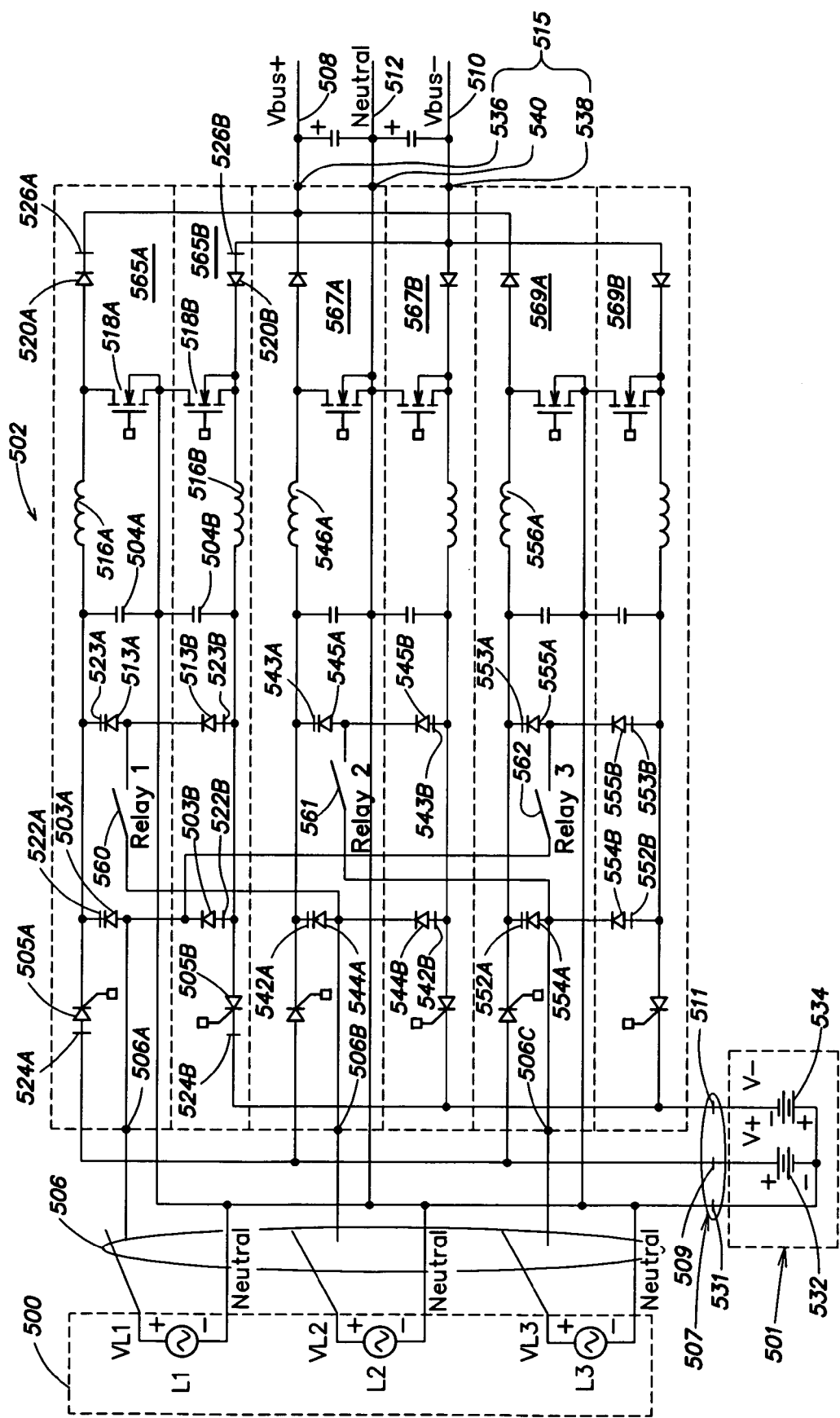
FIG. 5 is a schematic diagram of a power converter in accordance with another embodiment of the invention.
Figure 7:
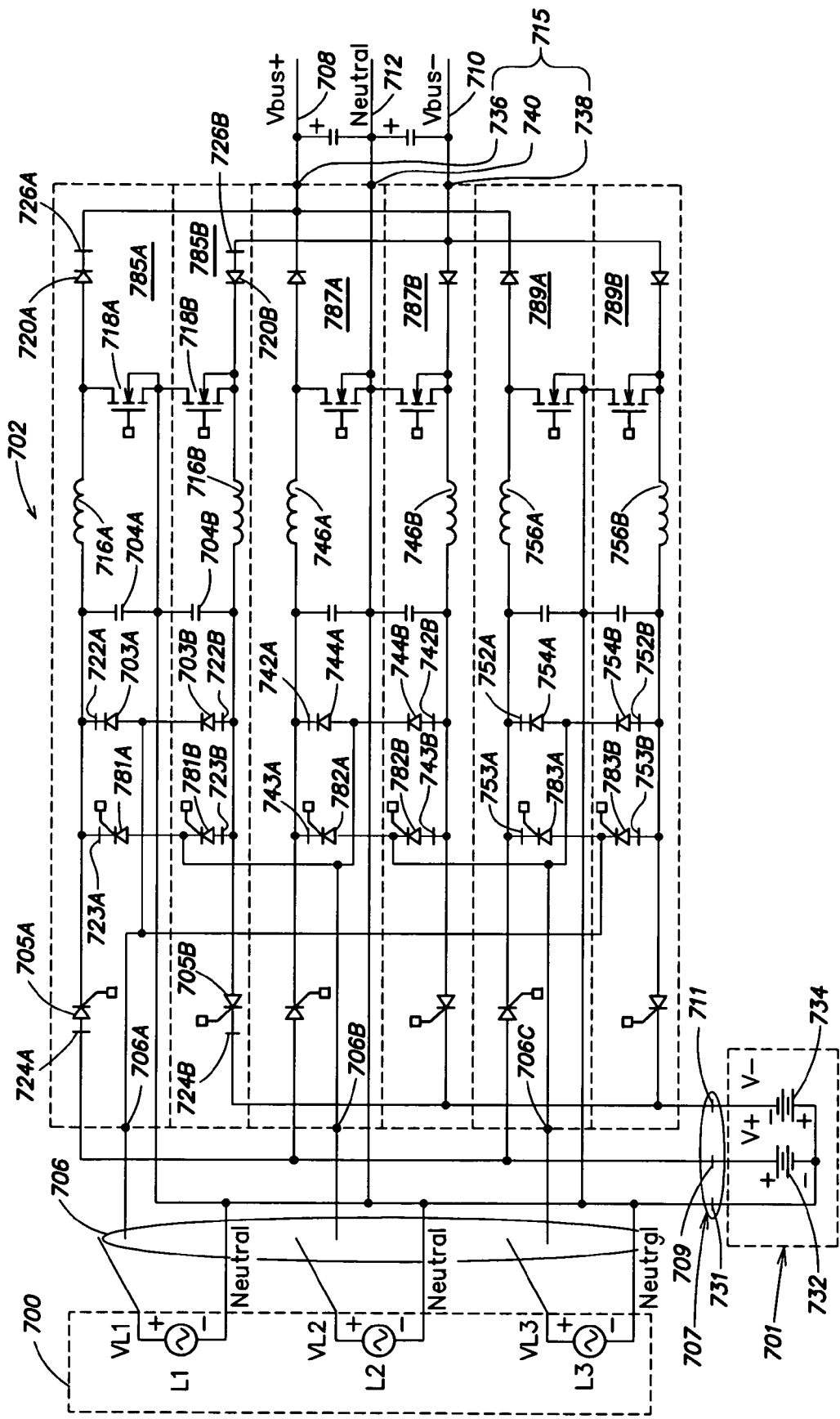
FIG. 7. is a schematic diagram of a power converter in accordance with yet another embodiment of the invention.

FIGS. 5 and 7 illustrate a first and a second embodiment of polyphase power converters, respectively, that operate in two general stages; a first stage of operation where the boost circuits included in the polyphase power converter can draw power in parallel from a plurality of phases of a polyphase AC source, and a second stage of operation where, in one embodiment, the boost circuits can draw power from a single line of the polyphase AC source. In one or more embodiments, the first stage of operation is employed during periods when the boost circuits are drawing current solely from the polyphase AC source and the second stage of operation is employed during periods when the boost circuits are drawing current from both the polyphase AC source and the DC power source.

Referring to FIG. 5, a polyphase power converter 502 includes a plurality of circuits 565A, 565B, 567A, 567B, 569A, 569B each connected to a plurality of phases of a polyphase AC source 500. According to one embodiment, each of the circuits 565A, 565B, 567A, 567B, 569A, 569B can be isolated from at least one phase of the polyphase AC source 500 by a switching device. In one embodiment, the polyphase power converter 502 includes a first switching device 560, a second switching device 561, and a third switching device 562, where the switching devices isolate a line input of one or more circuits (e.g., the pairs of circuits 565A/565B, 567A/567B, 569A/569B) from the polyphase AC source 500. Operation of the switching devices (i.e., switching devices 560, 561, 562) can allow the circuits 565A, 565B, 567A, 567B, 569A, 569B to draw power from a plurality of phases of the polyphase AC source 500 in the first stage of operation while allowing the circuits 565A, 565B, 567A, 567B, 569A, 569B to draw power from only a single phase of the polyphase AC source in the second stage of operation.

The polyphase power converter 502 of FIG. 5 includes an AC input 506 that includes inputs 506A, 506B, 506C each connected to a phase of the polyphase AC source 500. The AC input 506 may also include a neutral input connected to a neutral 512. An embodiment of the polyphase power converter 502 also includes a DC input 507 and a DC output 515. The DC input 507 can include a positive DC input 509, a negative DC input 511, and a neutral input 531. In a version of this embodiment, the positive DC input 509 is connected to the DC power source 501 at a positive DC terminal and the negative DC input 511 is connected to the DC power source 501 at a negative DC terminal. In the embodiment illustrated in FIG. 5, the DC power source 501 includes a first battery 532 and a second battery 534.

The DC output 515 can include a positive DC output 536, a negative DC output 538, and a neutral output 540. In one embodiment, the positive DC output 536 is connected to a positive DC bus 508, the negative DC output 538 is connected to a negative DC bus 510, and the neutral output 540 is connected to the neutral 512.

In accordance with one embodiment, the polyphase power converter 502 includes both a plurality of circuits (e.g., 565A, 567A, 569A) that each include a positive boost circuit and a plurality of circuits (e.g., 565B, 567B, 569B) that each include a negative boost circuit. Further, in one embodiment, a positive boost circuit and a corresponding negative boost circuit (e.g., circuits 565A and 565B) are connected to a plurality of phases of the polyphase AC source 500, and in particular, they can be connected to the same phases of the AC source. In one version of this embodiment, the polyphase power converter 502 includes a plurality of pairs of boost circuits (e.g., 565A/565B, 567A/567B, 569A/569B) that are connected to the same phases. That is, in one embodiment, each of the circuits 565A, 565B are connected to a first phase and a second phase (i.e., lines L1 and L2), each of the circuits 567A, 567B are connected to the second phase and a third phase (i.e., lines L2 and L3), and each of the circuits 569A, 569B are connected to the first phase and the third phase (i.e., lines L1 and L3).

According to one embodiment, each of the circuits 565A, 567A, 569A (e.g., the positive boost circuits) include a first line input connected to a phase of the polyphase AC source 500, a second line input connected to a different phase of the polyphase AC source 500, a DC input and a DC output. In this embodiment, each of the circuits 565B, 567B, 569B (e.g., the negative boost circuits) include a first line input connected to a phase of the polyphase AC source 500, a second line input connected to a different phase of the polyphase AC source 500, a DC input and a DC output.

More specifically, regarding the pair of circuits 565A/565B that are both connected to lines L1 and L2 of the polyphase AC source 500, the circuit 565A includes: a first line input 522A; a second line input 523A; a DC input 524A and a DC output 526A. In addition, the circuit 565B includes a first line input 522B; a second line input 523B; a DC input 524B and a DC output 526B. In one embodiment, the polyphase AC source 500 is a three-phase source (i.e., with lines L1, L2, L3) where the first line inputs 522A, 522B of each of the circuits 565A, 565B, respectively, are connected to line L1 and the second line inputs 523A, 523B of each of the circuits 565A, 565B, respectively, are connected to line L2.

The circuit 567A also includes: a first line input 542A and a second line input 543A; the circuit 567B includes a first line input 542B and a second line input 543B; the circuit 569A includes a first line input 552A and a second line input 553A; and the circuit 569B includes a first line input 552B and a second line input 553B. In one embodiment, each of the first line inputs of the circuits 567A, 567B (i.e., line inputs 542A, 542B, respectively) are connected to the line L2 while each of the second line inputs of the circuits 567A, 567B (i.e., line inputs 543A, 543B, respectively) are connected to the line L3. Further, each of the first line inputs of the circuits 569A, 569B (i.e., line inputs 552A, 552B, respectively) are connected to the line L3 while each of the second line inputs of the circuits 569A, 569B, (i.e., line inputs 553A, 553B, respectively) are connected to the line L1. As illustrated in FIG. 5, in one embodiment, each line input (e.g., the line input 553B) is connected to the corresponding line through a rectifier (e.g., a rectifier 555B).

In addition to a switching device (e.g., the switching devices 560, 561, 562), in one embodiment, each of the plurality of circuits 565A, 565B, 567A, 567B, 569A, 569B includes a first rectifier, a second rectifier, a SCR, a capacitor, an inductor, a switch, and a diode. For example, the circuit 565A includes a first rectifier 503A, a second rectifier 513A, a SCR 505A, a capacitor 504A, an inductor 516A, a switch 518A, and a diode 520A. The circuit 565B includes a first rectifier 503B, a second rectifier 513B, a SCR 505B, a capacitor 504B, an inductor 516B, a switch 518B, and a diode 520B.

In one embodiment, the circuit 565A which includes a positive boost circuit is configured as follows: a first phase of the polyphase AC source is connected to an anode of the first rectifier 503A; a cathode of the first rectifier 503A is connected to the first line input 522A; a second phase of the polyphase AC source is connected to an anode of the second rectifier 513A; a cathode of the second rectifier 513A is connected to the second line input 523A; an anode of the SCR 505A is connected to the DC input 524A which is connected to the positive DC input 509; a cathode of the SCR 505A, the first line input 522A, the second line input 523A, and a terminal of the capacitor 504A are connected at the input side of the inductor 516A; a second terminal of the capacitor 504A is connected to the neutral 512; the output side of the inductor 516A is connected to a first terminal of the switch and to an anode of the diode 520A; a second terminal of the switch is connected to the neutral 512; a cathode of the diode 520A is connected to the positive DC output 526A which is connected to the DC output 515 of the polyphase power converter 502 at the positive DC output 536.

Each of the additional circuits included in the polyphase power converter 502 that include a positive boost circuit (i.e., the circuits 567A, 569A) are configured in a similar fashion, however, they are not connected to the same combination of phases of the polyphase AC source 500 as is the circuit 565A.

For example, referring to the remaining two circuits (i.e., circuits 567A, 569A) that include a positive boost circuit: the circuit 567A includes a first rectifier 544A, a second rectifier 545A, the first line input 542A, the second line input 543A, and an inductor 546A. An anode of the first rectifier 544A is connected to a first phase of the polyphase AC source 500; a cathode of the first rectifier 544A is connected to the first line input 542A; an anode of the second rectifier 545A is connected to a second phase of the polyphase AC source 500; a cathode of the second rectifier 545A is connected to the second line input 543A; and each of the first line input 542A and the second line input 543A are connected to the input side of the inductor 546A.

Referring now to the circuit 569A: the circuit includes a first rectifier 554A, a second rectifier 555A, the first line input 552A, the second line input 553A, and an inductor 556A. An anode of the first rectifier 554A is connected to a first phase of the polyphase AC source 500; a cathode of the first rectifier 554A is connected to the first line input 552A; an anode of the second rectifier 555A is connected to a second phase of the polyphase AC source 500; a cathode of the second rectifier 555A is connected to the second line input 553A; and the first line input 552A and the second line input 553A are connected to an input side of the inductor 556A.

In one embodiment, the circuit 565B which includes a negative boost circuit is configured as follows: a first phase of the polyphase AC source 500 is connected to a cathode of the first rectifier 503B; an anode of the first rectifier 503B is connected to the first line input 522B; a second phase of the polyphase AC source 500 is connected to a cathode of the second rectifier 513B; an anode of the second rectifier 513B is connected to the second line input 523B; a cathode of the SCR 505B is connected to the DC input 524B which is connected to the negative DC input 511; an anode of the SCR 505B, the first line input 522B, the second line input 523B, and a terminal of the capacitor 504B are connected at the input side of the inductor 516B; a second terminal of the capacitor 504B is connected to the neutral 512; an output side of the inductor 516B is connected to a first terminal of the switch 518B and to the cathode of the diode 520B; a second terminal of the switch 518B is connected to the neutral 512; an anode of the diode 520B is connected to the negative DC output 526B which is connected to the DC output 515 of the polyphase power converter 502 at the negative DC output 538.

Each of the additional circuits that include a negative boost circuit (i.e., the circuits 567B, 569B) are configured in a similar fashion, however, they are not connected to the same combination of phases of the polyphase AC source 500 as is the circuit 565B.

In accordance with one embodiment, each of the plurality of circuits 565A, 565B, 567A, 567B, 569A, 569B includes at least three operating sections that are employed together generally in the same manner as described above with reference to embodiments of FIG. 2, i.e., control of the DC input, rectification of the AC input and control of a boost circuit operation.

The operation of the circuits is controlled by a controller which may be configured to control the operation of the circuits 565A, 565B, 567A, 567B, 569A, 569B however, in addition to providing one or more control signals for SCRs (e.g., the SCR 505A) and switches (e.g., the switch 518A), in one embodiment, the controller may also provide control signals for one or more of the switching devices 560, 561, 562.

According to one embodiment, the controller uses the information provided by one or more current sensors to generate one or more control signals that control the operation of the switches included in the circuit, for example, the SCR 505A, the switch 518A included in the circuit 525A and the switching device 560.

The operation of the circuits connected to the positive DC output 536 (e.g., the circuits 565A, 567A, 569A) is described below, however, the circuits connected to the negative DC output 538 (e.g., circuits 565B, 567B, 569B) operate in a similar fashion during the negative portion of the line cycles.

The operation of embodiments of the polyphase power converter 502 of FIG. 5 differ from the operation of embodiments of the polyphase power converter 202 of FIG. 2 because one or more of the line inputs (e.g., line input 522A) can be isolated from the polyphase AC source 500 in at least one operating state (e.g., the second operating state). In general, in one embodiment, the first operating state of the polyphase power converter 502 (i.e., with the switches 560, 561, 562 closed) shares one or more operating characteristics of embodiments of the polyphase power converter 202 of FIG. 2, and the second operating state of the polyphase power converter 502 (i.e., with the switches 560, 561, 562 open) shares one or more operating characteristics of embodiments of the polyphase power converter 102 of FIG. 1.

More specifically, the waveform-plots 480, 482 and 484 can be referred to again when describing the first operating state of the polyphase power converter 502 where the switches 560, 561, 562 are closed. Here too, it is assumed that the polyphase AC source 200 is a balanced, symmetrical three-phase system that includes a 120 degree phase displacement between the lines L1, L2 and L3. In addition, embodiments of the polyphase power converter 502 can be employed in non-symmetrical systems, those systems having an unbalanced load and systems having a phase displacement other than 120 degrees. Also, for the purpose of describing the operation of the polyphase power converter 502 the x-axis is labeled with the phase angle of line L1 of the polyphase AC source 500.

The first waveform 480 illustrates the voltage present at the input side of the inductor 516A of the circuit 565A which is supplied from the first line input 522A (line L1) and the second line input 523A (line L2), respectively. The second waveform 482 illustrates the voltage present at the input side of the inductor in the circuit 567A which is supplied from the first line input 542A (line L2) and the second line input 543A (line L3) of the circuit 567A, respectively. The third waveform 484 illustrates the voltage present at the input side of the inductor in the circuit 569A which is supplied from first line input 552A (line L3) and the second line input 553A (line L1), respectively.

According to one embodiment, the circuit 565A operates as shown in waveform-plot 480 during the first stage of operation. At 0-150 degrees, the rectifier 503A conducts and consequently the positive voltage present on line L1 appears at the first line input 522A of the circuit 565A which corresponds to the input side of the inductor 516A, i.e., it is supplied to the boost circuit included in the circuit 565A. At 150 degrees (i.e., the point where the instantaneous voltage of line L2 exceeds the instantaneous voltage of line L1), the rectifier 503A stops conducting and the rectifier 513A begins conducting. As a result, the positive voltage present on line L2 appears at the second line input 523A corresponding to the input side of the inductor 516A. That is, at 150 degrees, the boost circuit included in the circuit 565A stops drawing current from line L1 and begins drawing current from line L2. Then, at 300 degrees, the circuit 565A stops drawing current from the polyphase AC source 500 because neither the line L1 nor the line L2 have a positive instantaneous voltage. Both the rectifiers 503A and 513A remain off until the next positive zero crossing of the line L1 which occurs at 360 degrees. According to one embodiment, at 360 degrees the above-described sequence of operation begins again.

Similar operating sequences occur for each of the two remaining circuits (i.e., the circuits 567A, 569A) that supply power to the positive DC output 536. For example, the operation of the circuit 567A is now described with reference to the waveform-plot 482. Here, the lines L2 and L3 to which the circuit 567A is connected are plotted over time. The first positive zero crossing of the line L2 that appears in the waveform-plot 482 occurs at 120 degrees. In the interest of clarity, this description begins at that point in time. At 120-270 degrees, the rectifier 544A conducts and the positive voltage present on line L2 appears at the first line input 542A of the circuit 567A corresponding to the input side of the inductor 546A, i.e., it is supplied to the boost circuit included in the circuit 567A.

At 270 degrees (i.e., the point where the instantaneous voltage of line L3 exceeds the instantaneous voltage of line L2), the rectifier 544A stops conducting and the rectifier 545A begins conducting. As a result, the positive voltage present on line L3 appears at the second line input 542A corresponding to the input side of the inductor 546A. That is, at 270 degrees, the boost circuit included in the circuit 567A stops drawing current from line L2 and begins drawing current from line L3. Then, at 420 degrees, the circuit 567A stops drawing current from the polyphase AC source 500 because neither the line L2 nor the line L3 have a positive instantaneous voltage. Both the rectifiers 544A and 545A remain off until the next positive zero crossing of the line L2 which occurs at 480 degrees. According to one embodiment, at 480 degrees the above-described sequence of operation begins again.

The operation of the third circuit (i.e., the circuit 569A) that supplies power to the positive DC output 536 is now described with reference to the waveform-plot 484. Here, the lines L3 and L1 to which the circuit 569A is connected are plotted over time. The first positive zero crossing of the line L3 that appears in the waveform-plot 484 occurs at 240 degrees. In the interest of clarity again, this description begins at that point in time. At 240-390 degrees, the rectifier 554A conducts and the positive voltage present on line L3 appears at the first line input 552A of the circuit 569A corresponding to the input side of the inductor 556A, i.e., it is supplied to the boost circuit included in the circuit 569A.

The magnitude of the positive waveform associated with the line L1 increases beginning at 360 degrees and at 390 degrees (i.e., the point where the instantaneous voltage of line L1 exceeds the instantaneous voltage of line L3), the rectifier 554A stops conducting and the rectifier 555A begins conducting. As a result, the positive voltage present on line L1 appears at the second line input 553A corresponding to the input side of the inductor 556A. That is, at 390 degrees, the boost circuit included in the circuit 569A stops drawing current from line L3 and begins drawing current from line L1. Then, at 540 degrees, the circuit 569A stops drawing current from the polyphase AC source 500 because neither the line L3 nor the line L1 have a positive instantaneous voltage. Both the rectifiers 554A and 555A remain off until the next positive zero crossing of the line L3 which occurs at 600 degrees. According to one embodiment, at 600 degrees the above-described sequence of operation begins again.

According to one embodiment, during the first operating state, power is drawn from a single phase simultaneously by two of the three circuits 565A, 567A, 569A. These regions are represented by the shaded areas that appear in FIG. 4. For example, at 30-150 degrees, power is drawn from line L1 by both the circuit 565A and the circuit 569A as shown in the waveform-plot 480 and the waveform-plot 484, respectively. Similarly, at 150-270 degrees power is drawn from the line L2 by both the circuit 565A and the circuit 567A as shown in the waveform-plot 480 and the waveform-plot 482, respectively. In addition, at 270-390 degrees power is drawn from the line L3 by both the circuit 567A and the circuit 569A as shown in the waveform-plot 482 and the waveform-plot 484, respectively.

As is shown in FIG. 4, in one embodiment, during the first operating state, the connection of a plurality of phases to each of the circuits 565A, 567A, and 569A allows the operation of each boost circuit for all but 60 degrees of a possible 360 degrees of operation every cycle of the polyphase AC source 500. As mentioned above with reference to the polyphase power converter 202 of FIG. 2, for a given amount of DC power, the magnitude of a DC current pulse increases as the available period during which the DC current pulse is drawn from a DC power source decreases. According to one embodiment, the second operating state of the polyphase power converter 502 provides a larger period during which DC power can be drawn from the DC power source 501 than the period available when the power converter 502 is in the first operating state. Thus, the second operating state can allow the polyphase power converter 502 to draw power from the DC power source 501 with lower magnitude current pulses.

According to one embodiment, the polyphase power converter 502 transitions from the first operating state to the second operating state when the switching devices 560, 561, 562 open and isolate one or more line inputs of the circuits 565A, 565B, 567A, 567B, 569A, 569B. In the embodiment shown in FIG. 5, the switch 560 isolates the line inputs 523A, 523B and the associated rectifiers 513A, 513B that are connected to the line L1 of the polyphase AC source 500. The switch 561 isolates the line inputs 543A, 543B and the associated rectifiers 545A, 545B that are connected to the line L2. In addition, the switch 562 isolates the line inputs 553A, 553B and the associated rectifiers 555A, 555B from the line L3. Thus, a single switching device (e.g., the switching device 560) isolates a plurality of line inputs. In a version of this embodiment, a single switching device isolates the line inputs of a pair of circuits that includes a circuit (e.g., the circuit 565A) that supplies power to a positive DC output (e.g., the positive DC output 536) and a circuit (e.g., the circuit 565B) that supplies power to a negative DC output (e.g., the negative DC output 538).

According to another embodiment, a separate switching device individually isolates the line input of a circuit. That is, a first switching device isolates a line input for the circuit 565A, a second switching device isolates a line input for the circuit 565B and four additional switching devices are separately employed to isolate a line input of the four remaining circuits 567A, 567B, 569A, 569B, respectively.

The switching device (e.g., switching devices 560, 561, 562) can be any device that allows the current path between two or more circuit components to be broken, i.e., to be made non-conductive. For example, the switching device 560 can be a relay or a solid state switch. In one embodiment, each switching device is a separate switching device to allow individually controlled isolation of circuits connected to each line of the polyphase AC source 500. For example, in a version of the embodiment where the switching devices 560, 561, 562 are relays and their associated contacts, each contact is operated using a separate relay coil. Individual control can assist in controlling the timing of the isolation and the reconnection of the circuits to the polyphase AC source, for example, to control the reconnection of the circuits to minimize or limit inrush current. In an alternate embodiment, the switching devices 560, 561, 562 are "gang-operated." That is, a single relay with a single operating coil is employed to simultaneously open and close two or more contacts. For example, a single operating coil may simultaneously open or close a first contact and a second contact where the first contact isolates the line input 522A of the circuit 565A and the second contact isolates the line input 522B of the circuit 565B.

The isolation of a circuit (e.g., the circuit 565A) may, in one embodiment, result in a relatively high inrush current when the circuit is reconnected to the polyphase AC source 500. For example, a relatively high inrush current may result based on the current draw of the capacitor (e.g., the capacitor 504A) when the circuit is reconnected. The level of inrush current may depend largely on the voltage of the line to which the circuit is reconnected. For example, a relatively large inrush may result where the capacitor is fully discharged and the voltage on the line is at a peak in the line cycle. Thus, according to one embodiment, the operation of each switching device (e.g., the switching devices 560, 561, 562) is controlled to limit the inrush current based on feedback concerning the voltage of the line connected to the switching device.

In one embodiment, the polyphase power converter 502 transitions from the first operating state to the second operating state thereby disconnecting at least one phase from each of the circuits 565A, 565B, 567A, 567B, 569A, 569B when power is supplied to the circuits from the DC power source 501. As mentioned above, in one or more embodiments, the circuits 565A, 565B, 567A, 567B, 569A, 569B can draw power from the DC power source 501 at least when the polyphase AC source 500 is unavailable and when the electrical demand on the DC output 515 would otherwise exceed a maximum allowable current rating of the polyphase AC source 500 (e.g., overload the AC source).

Figure 6:
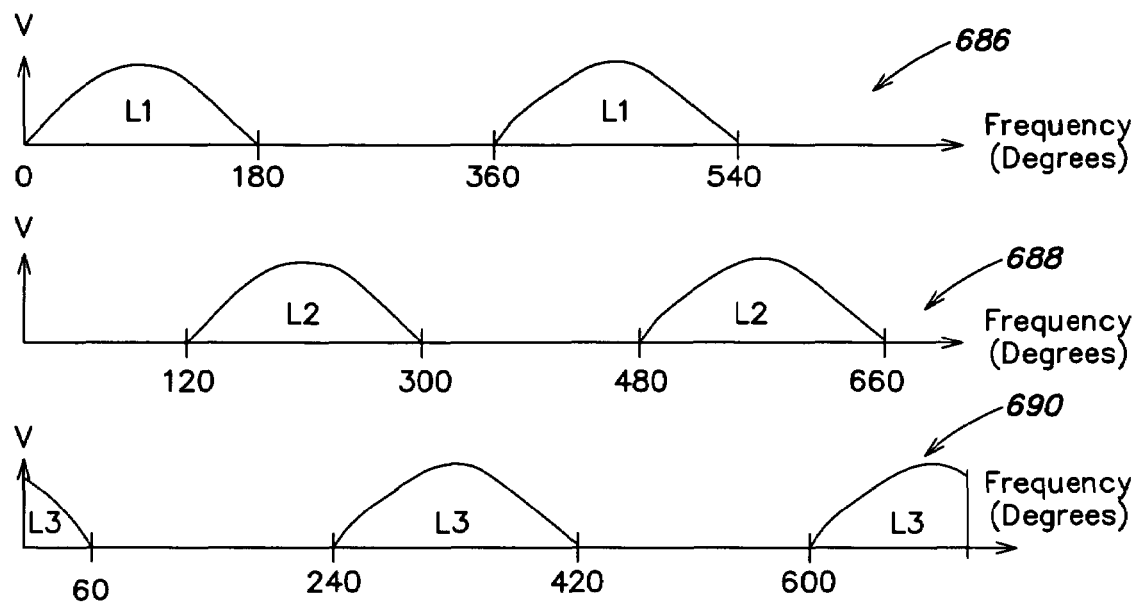
FIG. 6 illustrates a plot of the voltage at a line input of a circuit employed in a power converter according to embodiments of the invention.

According to one embodiment, in the second operating state, each of the circuits 565A, 565B, 567A, 567B, 569A, 569B remains connected to a single phase of the polyphase AC source 500. As a result, in one embodiment, the polyphase power converter 502 of FIG. 5 operates in a manner that is similar to the manner in which the polyphase power converter 102 of FIG. 1 operates. For example, FIG. 6 illustrates the voltage appearing at each of the line inputs for the circuits 565A, 567A, 569A which remain connected to the polyphase AC source 500 in the second operating state. That is, the waveform-plot 686 represents the voltage appearing at the first line input 522A of the circuit 565A, the waveform-plot 688 represents the voltage appearing at the first line input 542A of the circuit 567A, and the waveform-plot 690 represents the voltage appearing at the first line input 552A of the circuit 569A.

In the second operating state, the circuit 565A draws current from the polyphase AC source 500 when the instantaneous voltage on line L1 is positive, i.e., at 0-180 degrees, 360-540 degrees, etc. The circuit 567A draws current from the polyphase AC source 500 when the instantaneous voltage on line L2 is positive, i.e., at 120-300 degrees, 480-660 degrees, etc. The circuit 569A draws current from the polyphase AC source 500 when the instantaneous voltage on line L3 is positive, i.e., at 0-60 degrees, 240-420 degrees, etc. Referring again to FIG. 4 for a representation of the operation of the circuits 565A, 567A, 569A during the first operating state and comparing the waveforms in FIG. 4 to the waveforms in FIG. 6, it is apparent that during the second operating state power is not drawn by the circuit 565A from line L2, by the circuit 567A from line L3, nor by the circuit 569A from line L1.

Each of the circuits 565B, 567B, 569B draw power from the lines L1, L2, L3 in a similar fashion and, in one embodiment, each circuit 565B, 567B, 569B includes a negative boost circuit connected to the negative DC output 538. Thus, in the first operating state, the circuits 565B, 567B, 569B collectively operate during the negative periods of the voltage waveform of the lines L1, L2, L3 in a manner similar to that described for their counterpart circuits 565A, 567A, 569A, respectively. That is, the circuits 565B, 567B, 569B each draw power from a plurality of phases of the polyphase AC source, and two or more of the circuits 565B, 567B, 569B may operate to draw power from the same lines during at least the first operating state. In one embodiment, two or more of the circuits 565B, 567B, 569B operate to draw power from the same line during the majority of the first operating state. Further, during the second operating state, a line input can be disconnected from each of the circuits 565B, 567B, 569B.

Thus, in one or more embodiments, the second operating state allows the circuits to draw current from the DC power source 501 for substantially 180 degrees of each line cycle. As a result, a DC current pulse of a reduced magnitude can be employed to deliver the same quantity of power that would be delivered with a larger magnitude pulse of shorter duration, for example, a DC current pulse drawn during the 60 degree period provided by embodiments of the polyphase power converter 202 of FIG. 2.

Although the switching device (e.g., the switching device 560) is located on the input side of the rectifier (e.g., the anode of the rectifier 503A) in the embodiment illustrated in FIG. 5, the switching device can be located anywhere in the circuit (e.g., the circuit 565A) that allows the isolation of a line input (e.g., the second line input 522A). For example, in another embodiment, the switching device is located on the output side of the rectifiers (e.g., at the cathode of the rectifier 503A, at the anode of the rectifier 503B, etc.) in one or more of the circuits 565A, 565B, 567A, 567B, 569A, 569B.

FIG. 7 is yet another embodiment of a polyphase power converter 702, including circuits 785A, 785B, 787A, 787B, 789A, 789B and switching devices 781A, 7811B, 782A, 782B, 783A, 783B that may isolate one or more line inputs from the polyphase AC source 700. For example, an embodiment of the polyphase power converter 202 of FIG. 2 can be modified by replacing a rectifier in each of the circuits 225A, 225B, 227A, 227B, 229A, 229B with a switching device (e.g., a thyristor, a silicon controlled rectifier, etc.), in the circuits 785A, 785B, 787A, 787B, 789A, 789B. According to one embodiment, the inclusion of a controlled rectifier in the circuits of the polyphase power converter 702 allows the converter to operate in at least two stages of operation.

In a first operating stage, the switching devices are turned on and each of the circuits can draw power from one or more phases of a polyphase AC source 700. In a version of this embodiment, each circuit can draw power from one or more phases of the polyphase AC source 700 at the same time as power is drawn from the same phase(s) by another of the circuits 785A, 785B, 787A, 787B, 789A, 789B. In a second operating stage, the switching devices are turned off and each of the circuits can draw power from a different single phase of the polyphase AC source. That is, in one embodiment, the circuits 785A and 785B draw current during the positive and the negative portions of the line cycle of the line L1, respectively; the circuits 787A and 787B draw current during the positive and negative portions of the line cycle of the line L2, respectively; and the circuits 789A and 789B draw current during the positive and negative portions of the line cycle of the line L3, respectively.

The polyphase power converter 702 includes an AC input 706 that includes inputs 706A, 706B, 706C each connected to a phase of the polyphase AC source 700. The AC input 706 may also include a neutral input connected to the neutral 712. The power converter 702 of FIG. 7 also includes a DC input 707 and a DC output 715. The DC input 707 can include a positive DC input 709, a negative DC input 711, and a neutral input 731. The DC input 707 is connected to a DC power source 701. In a version of this embodiment, the positive DC input 709 is connected to the DC power source 701 at a positive DC terminal and the negative DC input 711 is connected to the DC power source 701 at a negative DC terminal. In the embodiment illustrated in FIG. 7, the DC power source 701 includes a first battery 732 and a second battery 734.

The DC output 715 can include a positive DC output 736, a negative DC output 738, and a neutral output 740. In one embodiment, the positive DC output 736 is connected to a positive DC bus 708, the negative DC output 738 is connected to a negative DC bus 710, and the neutral output 740 is connected to a neutral 712.

In accordance with one embodiment, the polyphase power converter 702 includes both a plurality of circuits (e.g., 785A, 787A, 789A) that include positive boost circuits and a plurality of circuits (e.g., 785B, 787B, 789B) that include negative boost circuits. Further, in one embodiment, a positive boost circuit and a corresponding negative boost circuit (e.g., circuits 785A and 785B) are connected to a plurality of the phases, and in particular, they can be connected to the same phases of the polyphase AC source 700. In one version of this embodiment, the polyphase power converter 702 includes a plurality of pairs of boost circuits (e.g., 785A/785B, 787A/787B, 789A/789B) where each circuit in the pair is connected to the same phases. That is, in one embodiment, each of the circuits 785A, 785B are connected to a first phase and a second phase (i.e., lines L1, L2), each of the circuits 787A, 787B are connected to the second phase and a third phase (i.e., lines L2, L3), and each of the circuits 789A, 789B are connected to the first phase and the third phase (i.e., lines L1, L3).

According to one embodiment, each of the circuits 785A, 787A, 789A (e.g., the positive boost circuits) include a first line input connected to a phase of the polyphase AC source 700, a second line input connected to a different phase of the polyphase AC source 700, a DC input and a DC output. In this embodiment, each of the circuits 785B, 787B, 789B (e.g., the negative boost circuits) include a first line input connected to a phase of the polyphase AC source 700, a second line input connected to a different phase of the polyphase AC source 700, a DC input and a DC output.

More specifically, regarding the pair of circuits 785A/785B that are both connected to the lines L1 and L2 of the polyphase AC source 700, the circuit 785A includes: a first line input 722A; a second line input 723A, a DC input 724A and a DC output 726A. In addition, the circuit 785B includes a first line input 722B; a second line input 723B, a DC input 724B and a DC output 726B. In one embodiment, the polyphase AC source 700 is a three-phase source (i.e., with lines L1, L2, L3) where the first line inputs 722A, 722B of each of the circuits 785A, 785B, respectively, are connected to line L1 and the second line inputs 723A, 723B of each of the circuits 785A, 785B, respectively, are connected to line L2.

In one embodiment, in addition to a switching device (e.g., the switching devices 781A, 781B, 782A, 782B, 783A, 783B), each of the plurality of circuits 785A, 785B, 787A, 787B, 789A, 789B includes a rectifier, a SCR, an inductor, a switch and a diode. For example, the circuit 785A includes the switching device 781A, a rectifier 703A, a SCR 705A, a capacitor 704A, an inductor 716A, a switch 718A and a diode 720A. The circuit 785B includes the switching device 781B, a rectifier 703B, a SCR 705B, a capacitor 704B, an inductor 716B, a switch 718B and a diode 720B.

In some embodiments, the switching device is also a rectifier, for example, the switching device 781A can be a controlled rectifier. Thus, in one embodiment, the circuit 785A includes a positive boost circuit and a controlled rectifier and is configured as follows: a first phase of the polyphase AC source is connected to an anode of the rectifier 703A; a cathode of the rectifier 703A is connected to the first line input 722A; a second phase of the polyphase AC source is connected to an anode of the switching device 781A; a cathode of the switching device 781A is connected to the second line input 723A; an anode of the SCR 705A is connected to the DC input 724A which is connected to the positive DC input 709; a cathode of the SCR 705A, the first line input 722A, the second line input 723A, and a terminal of the capacitor 704A are connected at the input side of the inductor 716A; a second terminal of the capacitor 704A is connected to the neutral 712; the output side of the inductor 716A is connected to a first terminal of the switch 718A and to an anode of the diode 720A; a second terminal of the switch 718A is connected to the neutral 712; a cathode of the diode 720A is connected to the positive DC output 726A which is connected to the DC output 715 of the polyphase power converter 702 at the positive DC output 736.

Each of the additional circuits included in the polyphase power converter 702 that include a positive boost circuit (i.e., the circuits 787A, 789A) are connected in a manner similar to the circuit 785A, however, they are not connected to the same combination of phases of the polyphase AC source 700 as is the circuit 785A.

For example, referring to the remaining two circuits (i.e., circuits 787A, 789A) that include a positive circuit, in one embodiment where the switching devices are controlled rectifiers: the circuit 787A includes a rectifier 744A, the switching device 782A, a first line input 742A, a second line input 743A, and an inductor 746A. An anode of the rectifier 744A is connected to a first phase of the polyphase AC source 700, a cathode of the rectifier 744A is connected to the first line input 742A; an anode of the switching device 782A is connected to a second phase of the polyphase AC source 700, a cathode of the switching device 782A is connected to the second line input 743A, and each of the first line input 742A and the second line input 743A are connected to the input side of the inductor 746A.

Referring now to an embodiment of the circuit 789A where the switching devices are controlled rectifiers: the circuit 789A includes a rectifier 754A, the switching device 783A, a first line input 752A, a second line input 753A and an inductor 756A. An anode of the rectifier 754A is connected to a first phase of the polyphase AC source 700; a cathode of the rectifier 754A is connected to the first line input 752A, an anode of the switching device 783A is connected to the second phase of the polyphase AC source 700, a cathode of the switching device 783A is connected to the second line input 753A, and the first line input 752A and the second line input 753A are connected to an input side of an inductor 756A.

In the illustrated embodiment of each of the preceding circuits (e.g., the circuits 785A, 787A, 789A), the first line input (e.g., the first line input 722A) is connected to the corresponding line through a rectifier (e.g., the rectifier 703A) and the second line input (e.g., the second line input 723A) is connected to the corresponding line by a switching device (e.g., the switching device 781A).

In one embodiment where the switching devices are controlled rectifiers, the circuit 785B which includes a negative boost circuit connected to the lines L1 and L2 is configured as follows: a first phase of the polyphase AC source 700 is connected to a cathode of the rectifier 703B; an anode of the rectifier 703B is connected to the first line input 722B; a second phase of the polyphase AC source 700 is connected to a cathode of the switching device 781B; an anode of the switching device 781B is connected to the second line input 723B; a cathode of the SCR 705B is connected to the DC input 724B which is connected to the negative DC input 711 of the polyphase power converter 702; an anode of the SCR 705B, the first line input 722B, the second line input 723B, and a terminal of the capacitor 704B are connected at the input side of the inductor 716B; a second terminal of the capacitor 704B is connected to the neutral 712; the output side of the inductor 716B is connected to a first terminal of the switch 718B and to the cathode of the diode 720B; a second terminal of the switch 718B is connected to the neutral 712; an anode of the diode 720B is connected to the negative DC output 726B which is connected to the DC output 715 of the polyphase power converter 702 at the negative DC output 738.

Each of the additional circuits that include a negative boost circuit (i.e., the circuits 787B, 789B) are connected in a similar fashion, however, they are not connected to the same combination of phases of the polyphase AC source 700 as is the circuit 785B. For example, referring to the remaining two circuits (i.e., circuits 787A, 789A) that include a negative boost circuit, the circuit 787B includes a rectifier 744B, the switching device 782B, a first line input 742B, a second line input 743B and an inductor 746B. A cathode of the rectifier 744B is connected to a first phase of the polyphase AC source 700; an anode of the rectifier 744B is connected to the first line input 742B; a cathode of the switching device 782B is connected to a second phase of the polyphase AC source 700; an anode of the switching device 782B is connected to the second line input 743B; and each of the first line input 742A and the second line input 743A are connected to the input side of the inductor 746B.

Referring now to the circuit 789B, the circuit includes a rectifier 754B, the switching device 783B, a first line input 752B, a second line input 753B and an inductor 756B. A cathode of the rectifier 754B is connected to a first phase of the polyphase AC source 700; an anode of the rectifier 754B is connected to the first line input 752B; a cathode of the switching device 783B is connected to a second phase of the polyphase AC source 700; an anode of the switching device 783B is connected to the second line input 753B; and the first line input 752B and the second line input 753B are connected to an input side of an inductor 756B.

In accordance with one embodiment, each of the plurality of circuits 785A, 785B, 787A, 787B, 789A, 789B of the polyphase power converter 702 includes at least three operating sections that are employed together generally in the same manner as described above with reference to embodiments of FIG. 2, i.e., control of the DC input, rectification of the AC input and control of boost circuit operation.

As explained above, the embodiment illustrated in FIG. 7 differs from the embodiment illustrated in FIG. 2 because at least one of the rectifiers include in the rectifier operating section is a controlled rectifier that can be switched from a conductive to a non-conductive state by the application of an appropriate control signal (e.g., a trigger signal).

The operation of the circuits included in the polyphase power converter 702 are controlled by a controller (not shown). According to one embodiment, the controller uses the information provided by the sensor to generate one or more switching signals that control the operation of the switches included in the circuit, for example, the switching device 781A, the SCR 705A and the switch 718A included in the circuit 785A.

The operation of embodiments of the polyphase power converter 702 of FIG. 7 differ from the operation of embodiments of the polyphase power converter 202 of FIG. 2 because one or more of the line inputs (e.g., line input 722A) are isolated from the polyphase AC source 700 in at least one operating state (e.g., the second operating state) by providing a control signal to a controlled rectifier to place the controlled rectifier in a non-conductive state. That is, the conductive state of the rectifiers (e.g., the rectifiers 203A, 213A) in the polyphase power converter 202 is determined by the voltage drop across the rectifier; therefore, in each circuit (e.g., the circuit 225A) the rectifier connected to the phase of the polyphase AC power source with the highest instantaneous voltage is conductive. In the embodiment illustrated in FIG. 7, however, the controlled rectifiers (e.g., the rectifiers 781A, 781B) can be placed in a non-conductive state that is independent of the voltage drop across the controlled rectifier. Thus, each of the circuits 785A, 785B, 787A, 787B, 789A, 789B may be placed in an operating state where the circuits only draw power from one of the two phases to which they are connected.

In general, in one embodiment, the first operating state of the polyphase power converter 702 (i.e., with the controlled rectifiers 781A, 781B, 782A, 782B, 783A, 783B turned off) shares one or more operating characteristics of embodiments of the polyphase power converter 202 of FIG. 2, and the second operating state of the polyphase power converter 702 (i.e., with the controlled rectifiers 781A, 781B, 782A, 782B, 783A, 783B turned on) shares one or more operating characteristics of embodiments of the polyphase power converter 102 of FIG. 1.

More specifically, the waveform-plots 480, 482 and 484 of FIG. 4 can be referred to when describing the first operating state of the polyphase power converter 702 where the controlled rectifiers can conduct current. Here too, it is again assumed that the polyphase AC source 700 is a balanced, symmetrical three-phase system that includes a 120 degree phase displacement between the lines L1, L2 and L3. Embodiments of the polyphase power converter 702 can be employed in non-symmetrical systems, those systems having an unbalanced loading, and systems having a phase displacement other than 120 degrees. Also, for the purpose of describing the operation of the polyphase power converter 702 the x-axis is labeled with the phase angle of line L1 of the polyphase AC source 700.

The first waveform 480 illustrates the voltage present at the input side of the inductor 716A of the circuit 785A which is supplied from the first line input 722A (line L1) and the second line input 723A (line L2), respectively. The second waveform 482 illustrates the voltage present at the input side of the inductor in the circuit 787A which is supplied from the first line input 742A (line L2) and the second line input 743A (line L3) of the circuit 787A, respectively. The third waveform 484 illustrates the voltage present at the input side of the inductor in the circuit 789A which is supplied from first line input 752A (line L3) and the second line input 753A (line L1), respectively.

According to one embodiment, in the first operating state, the circuit 785A operates as shown in waveform-plot 480 during the first stage of operation. At 0-150 degrees, the rectifier 703A conducts and consequently the positive voltage present on line L1 appears at the first line input 722A of the circuit 785A which corresponds to the input side of the inductor 716A, i.e., it is supplied to the boost circuit included in the circuit 785A. At 150 degrees (i.e., the point where the instantaneous voltage of line L2 exceeds the instantaneous voltage of line L1), the rectifier 703A stops conducting and the controlled rectifier 713A begins conducting. As a result, the positive voltage present on line L2 appears at the second line input 723A corresponding to the input side of the inductor 716A. That is, at 150 degrees, the boost circuit included in the circuit 785A stops drawing current from line L1 and begins drawing current from line L2. Then, at 300 degrees, the circuit 785A stops drawing current from the polyphase AC source 700 because neither the line L1 nor the line L2 have a positive instantaneous voltage. Both the rectifier 703A and controlled rectifier 713A remain off until the next positive zero crossing of the line L1 which occurs at 360 degrees. According to one embodiment, at 360 degrees the above-described sequence of operation begins again.

Similar operating sequences occur for each of the two remaining circuits (i.e., the circuits 787A, 789A) that supply power to the positive DC output 736. For example, the operation of the circuit 787A is now described with reference to the waveform-plot 482. Here, the lines L2 and L3 to which the circuit 787A is connected are plotted over time. The first positive zero crossing of the line L2 that appears in the waveform-plot 482 occurs at 120 degrees. In the interest of clarity, this description begins at that point in time. At 120-270 degrees, the rectifier 744A conducts and the positive voltage present on line L2 appears at the first line input 742A of the circuit 787A corresponding to the input side of the inductor 746A, i.e., it is supplied to the boost circuit included in the circuit 787A.

At 270 degrees (i.e., the point where the instantaneous voltage of line L3 exceeds the instantaneous voltage of line L2), the rectifier 744A stops conducting and the controlled rectifier 782A begins conducting. As a result, the positive voltage present on line L3 appears at the second line input 743A corresponding to the input side of the inductor 746A. That is, at 270 degrees, the boost circuit included in the circuit 787A stops drawing current from line L2 and begins drawing current from line L3. Then, at 420 degrees, the circuit 787A stops drawing current from the polyphase AC source 700 because neither the line L2 nor the line L3 have a positive instantaneous voltage. Both the rectifier 744A and controlled rectifier 781A remain off until the next positive zero crossing of the line L2 which occurs at 480 degrees. According to one embodiment, at 480 degrees the above-described sequence of operation begins again.

The operation of the third circuit (i.e., the circuit 789A) that supplies power to the positive DC output 736 is now described with reference to the waveform-plot 484. Here, the lines L3 and L1 to which the circuit 789A is connected are plotted over time. The first positive zero crossing of the line L3 that appears in the waveform-plot 484 occurs at 240 degrees. In the interest of clarity again, this description begins at that point in time. At 240-390 degrees, the rectifier 754A conducts and the positive voltage present on line L3 appears at the first line input 752A of the circuit 789A corresponding to the input side of the inductor 756A, i.e., it is supplied to the boost circuit included in the circuit 789A.

The magnitude of the positive waveform associated with the line L1 increases beginning at 360 degrees and at 390 degrees (i.e., the point where the instantaneous voltage of line L1 exceeds the instantaneous voltage of line L3), the rectifier 754A stops conducting and the controlled rectifier 783A begins conducting. As a result, the positive voltage present on line L1 appears at the second line input 753A corresponding to the input side of the inductor 756A. That is, at 390 degrees, the boost circuit included in the circuit 789A stops drawing current from line L3 and begins drawing current from line L1. Then, at 540 degrees, the circuit 789A stops drawing current from the polyphase AC source 700 because neither the line L3 nor the line L1 have a positive instantaneous voltage. Both the rectifier 754A and 783A remain off until the next positive zero crossing of the line L3 which occurs at 600 degrees. According to one embodiment, at 600 degrees the above-described sequence of operation begins again.

According to one embodiment, during the first operating state, power can be drawn from a single phase simultaneously by two of the three circuits 785A, 787A, 789A. These regions are represented by the shaded areas that appear in FIG. 4. For example, at 30-150 degrees, power is drawn from line L1 by both the circuit 785A and the circuit 789A as shown in the waveform-plot 480 and the waveform-plot 484, respectively. Similarly, at 150-270 degrees power is drawn from the line L2 by both the circuit 785A and the circuit 787A as shown in the waveform-plot 480 and the waveform-plot 482, respectively. In addition, at 270-390 degrees power is drawn from the line L3 by both the circuit 787A and the circuit 789A as shown in the waveform-plot 482 and the waveform-plot 484, respectively.

As is shown in FIG. 4, in one embodiment, during the first operating state, the connection of a plurality of phases to each of the circuits 785A, 787A, and 789A allows the operation of each boost circuit for all but 60 degrees of a possible 360 degrees of operation every cycle of the polyphase AC source 700. As mentioned above with reference to the polyphase power converter 202 of FIG. 2, for a given amount of DC power, the magnitude of the DC current pulse increases as the available period during which the DC current pulse is drawn from the DC power source decreases. According to one embodiment, the second operating state of the polyphase power converter 702 provides a larger period during which DC power can be drawn from the DC power source 701 than the period available when the power converter 702 is in the first operating state. Thus, the second operating state can allow the polyphase power converter to draw power from the DC power source 701 with lower magnitude current pulses.

According to one embodiment, the polyphase power converter 702 transitions from the first operating state to the second operating state when the controlled rectifiers are turned off so that they cannot conduct even when the appropriate voltage drop is present across the controlled rectifier. Thus, in the second operating state the controlled rectifiers may isolate one or more line inputs of the circuits 785A, 785B, 787A, 787B, 789A, 789B. In some embodiments, each circuit employs a separate controlled rectifier to isolate a line input from a phase of the polyphase AC source.

According to one embodiment, the line L2 of the polyphase AC source 700 is isolated from the line inputs 723A, 723B by the controlled rectifiers 781A, 781B, respectively; the line L3 is isolated from the line inputs 743A, 743B by the controlled rectifiers 782A, 782B respectively; and the line L1 is isolated from the line inputs 753A, 753B by the controlled rectifiers 783A, 783B, respectively.

As mentioned above, the levels of inrush current that may occur as a result of switching the switching devices in FIG. 5 may be limited by controlling the operation of the switching devices. Similarly, the levels of in rush current that may occur as a result of switching the switching devices (e.g., the switching device 781A) from off to on may be limited by controlling the switching operation when the switching devices are returned to a conductive state. According to one embodiment, the operation of each controlled rectifier (e.g., the controlled rectifiers 781A, 7811B, 782A, 782B, 783A, 783B) is controlled to limit the inrush current based on feedback concerning the voltage of the line connected to the controlled rectifier.

In one embodiment, the polyphase power converter 702 transitions from the first operating state to the second operating state thereby effectively disconnecting at least one phase from each of the circuits 785A, 785B, 787A, 787B, 789A, 789B when power is supplied to the circuits from the DC power source 701. In one or more embodiments, the circuits 785A, 785B, 787A, 787B, 789A, 789B can draw power from the DC power source 701 at least when the polyphase AC source 700 is unavailable and when the electrical demand on the DC output 715 would otherwise exceed a maximum allowable current rating of the polyphase AC source 700 (e.g., overload the AC source).

According to one embodiment, in the second operating state, with the controlled rectifier turned off in each of the circuits 785A, 785B, 787A, 787B, 789A, 789B, a line input of each circuit remains connected to a single phase of the polyphase AC source 700 via an operational rectifier (e.g., the rectifier 703A). As a result, in one embodiment, during the second operating state, the polyphase power converter 702 of FIG. 7 operates in a manner that is similar to the manner in which the polyphase power converter 102 of FIG. 1 operates. For example, FIG. 6 illustrates the voltage appearing at each of the line inputs for the circuits 785A, 787A, 789A which remain connected to the polyphase AC source 700 in the second operating state. That is, the waveform-plot 686 represents the voltage appearing at the first line input 722A of the circuit 785A, the waveform-plot 688 represents the voltage appearing at the first line input 742A of the circuit 787A, and the waveform-plot 690 represents the voltage appearing at the first line input 752A of the circuit 789A.

In the second operating state, the circuit 785A draws current from the polyphase AC source 700 when the instantaneous voltage on line L1 is positive, i.e., at 0-180 degrees, 360-540 degrees, etc. The circuit 787A draws current from the polyphase AC source 700 when the instantaneous voltage on line L2 is positive, i.e., at 120-300 degrees, 480-660 degrees, etc. The circuit 789A draws current from the polyphase AC source 700 when the instantaneous voltage on line L3 is positive, i.e., at 0-60 degrees, 240-420 degrees, etc. Referring again to FIG. 4 for a representation of the operation of the circuits 785A, 787A, 789A during the first operating state and comparing the waveforms in FIG. 4 to the waveforms in FIG. 6, it is apparent that during the second operating state power is not drawn by the circuit 785A from line L2, by the circuit 787A from line L3, nor by the circuit 789A from line L1.

In one embodiment, each of the circuits 785B, 787B, 789B draw power from the lines L1, L2, L3 in a similar fashion and, in one embodiment, each circuit 785B, 787B, 789B includes a negative boost circuit connected to the negative DC output 738. Thus, in the first operating state, the circuits 785B, 787B, 789B collectively operate during the negative periods of the voltage waveform of the lines L1, L2, L3 in a manner similar to that described for their counterpart circuits 785A, 787A, 789A. That is, the circuits 785B, 787B, 789B each draw power from a plurality of phases of the polyphase AC source, and two or more of the circuits 785B, 787B, 789B may operate to draw power from the same lines during at least the first operating state. In one embodiment, two or more of the circuits 785B, 787B, 789B operate to draw power from the same line during the majority of the first operating state. Further, during the second operating state, a line input in each of the circuits 785B, 787B, 789B can be disconnected from a phase of the polyphase AC source 700.

Referring again to FIG. 3B, a waveform-plot according to an embodiment of a polyphase power converter 202 illustrates one or more step-changes in the current drawn by the circuit 225A from the lines L1 and L2 of the polyphase AC source 200. Here "step-changes" refers to the fact that there is a substantially instantaneous change in the current from a first magnitude to a second magnitude. For example, at 150 degrees there is a substantially instantaneous change in the current drawn from each of the line L1 and the line L2. At 150 degrees, the current drawn from the line L1 drops from a first magnitude to zero and the current drawn from the line L2 increases from zero to the first magnitude. At 270 degrees, another example of a step-change concerning the line L2 is illustrated. There, the current drawn from the line L2 increases substantially instantaneously. These step-changes in current occur frequently enough that, in some embodiments, it may be advantageous to eliminate them.

Specifically, a relatively high degree of distortion on the AC line supplying the circuit may result when a boost circuit includes the step-changes in current illustrated in FIG. 3B. For example, if the step-change in current on the phase that a circuit is drawing current from (e.g., instantaneous drop to zero at 150 degrees, for the current drawn from the line L1 for the circuit 225) does not precisely correspond to the moment when a first phase voltage (e.g., the voltage on the line L2) actually exceeds a second phase voltage (e.g., the voltage on the line L1) the line current is likely to be distorted. In particular, where the plurality of phases of the polyphase AC source have a significant phase imbalance or voltage imbalance the line current is more likely to be distorted as a result of the instantaneous changes in current.

Figure 8:
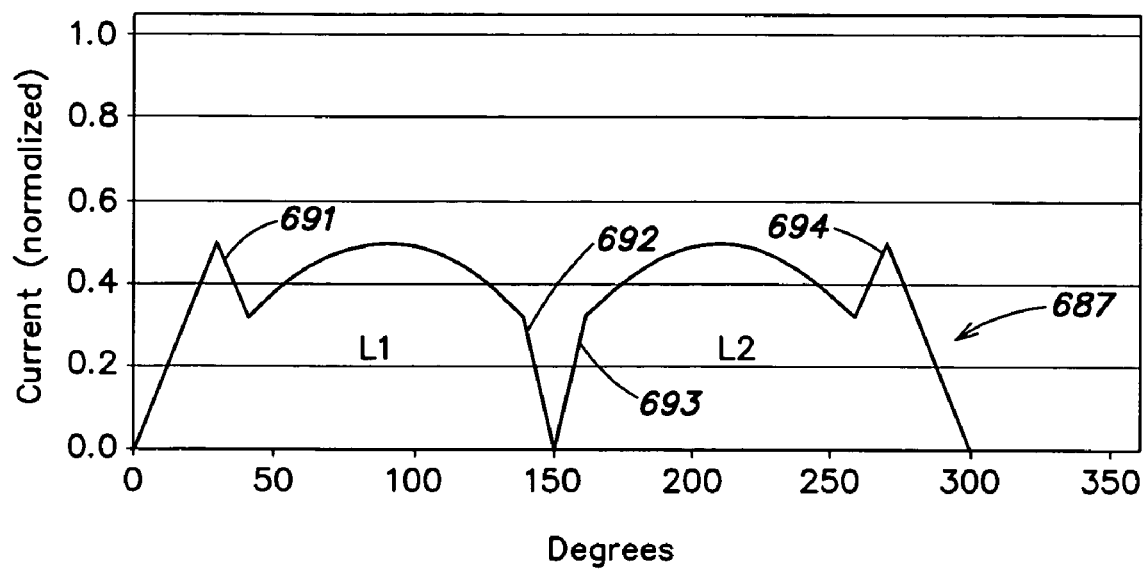
FIG. 8 illustrates a plot of the current drawn by a boost circuit in accordance with an embodiment of the invention.
Figure 9:
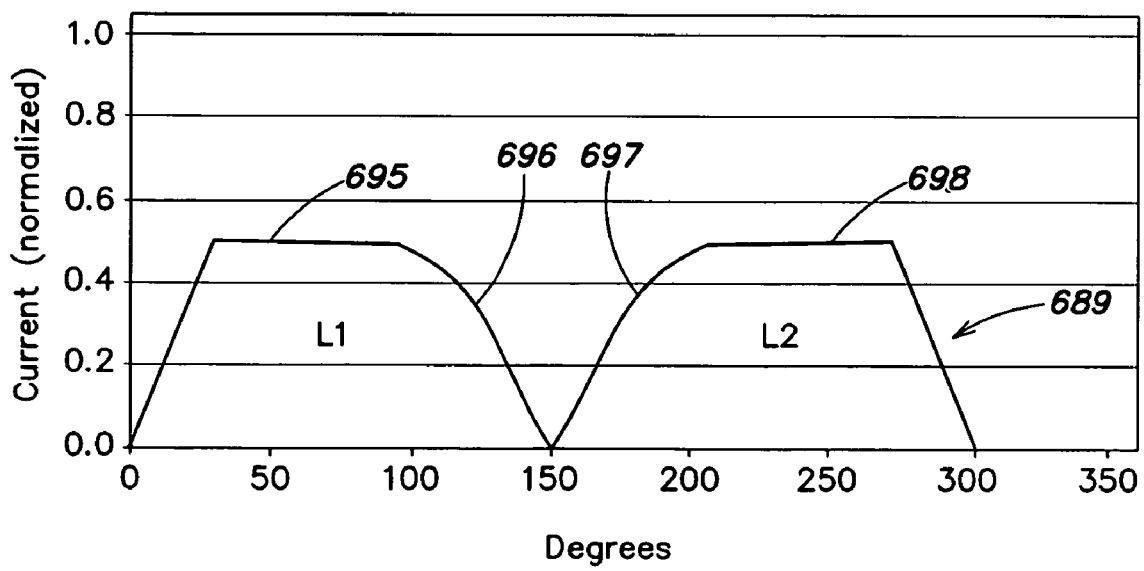
FIG. 9 illustrates a plot of the current drawn by a boost circuit in accordance with yet another embodiment of the invention.

According to one embodiment, the operation of the circuits (e.g., the circuits 225A, 565A, 785A of the polyphase power converters 202, 502, 702, respectively) is controlled to prevent step-changes in current demand to reduce or eliminate the harmonic distortion created by the polyphase power converter on the lines of the polyphase AC source to which it is connected. For example, the current waveforms illustrated in FIGS. 8 and 9 illustrate two such approaches. In general, each approach makes the timing of the transitions in current drawn from the various phases of the polyphase AC source less critical to achieving a low total harmonic distortion.

FIG. 8 illustrates the current demand on, for example, lines L1 and lines L2 of a circuit (e.g., the circuits 225A, 565A, 785A) included in polyphase power converters according to embodiments of the invention. As will be understood by those of ordinary skill in the art, the current illustrated in FIG. 8 can be drawn from any two phases of the polyphase power converter that are connected to the circuit (e.g., the circuit 229A and lines L1 and L3, the circuit 565A and lines L1 and L2, the circuit 787A and the lines L2 and L3). In addition, the approach illustrated in FIG. 8 can be employed with any number of lines (e.g., three or more) connected to a circuit, e.g., the circuit 565A. Using the circuit 565A as an example for the purposes of this description, the current demand of the circuit 565A illustrated by waveform 687 includes sloped regions 691, 692, 693, 694 beginning at approximately 30 degrees, 140 degrees, 150 degrees and 260 degrees, respectively. In one embodiment, each of the regions 691, 692, 693, 694 has a linear slope, however, the regions may also have non-linear slopes in some embodiments.

As described above, the circuit 565A alone draws current from the line L1 between approximately 0 and 30 degrees of the line cycle. At 30 degrees, the circuit 569A also begins to draw current from the line L1. To maintain a substantially unity power factor and a current waveform with a low total harmonic distortion, the magnitude of the current drawn by the circuit 565A is reduced at approximately 30 degrees when the parallel operation of the circuits 565A and 569A begins. In the embodiment shown in FIG. 8, the amount of current drawn by the circuit 565A is reduced at a rate corresponding to the negative slope of the current demand in the region 691. In addition, at approximately 150 degrees, a transition occurs where the current is no longer drawn from the line L1 and current begins to be drawn from the line L2. Unlike the embodiment depicted in FIG. 3B, however, the current drawn from the line L1 is reduced at a rate corresponding to the negative slope of the current demand in the region 692, i.e., a step-change does not occur. At approximately 150 degrees, the current drawn from the line L1 reaches zero. Also, at approximately 150 degrees, the current drawn from the line L2 begins to increase from zero at a rate corresponding to the positive slope of the current demand in the region 693. As a result, the step-change of the current demand from the line L2 does not occur at the transition.

Due to the parallel operation of the circuits 565A and 567A, the current drawn by the circuit 565A from the line L2 is reduced for the period beginning at the end of the region 693 until the start of the region 694. At approximately 270 degrees, the circuit 565A becomes the only circuit that is drawing current from the line L2 and the current drawn by the circuit 565A is no longer reduced. The current drawn from the line L2 is gradually increased at a rate corresponding to the positive slope of the current demand in the region 694. Thus, the same magnitude of current may be drawn at 270 degrees by the two different embodiments illustrated in FIG. 3B and FIG. 8, however, the embodiment of FIG. 8 avoids a step-change in the current waveform at 270 degrees. A further result of the approach shown in FIG. 8, is that the RMS value of current waveform 687 is approximately 73.4% of the RMS value of the current waveform of FIG. 3A. This is a slight increase when compared with the RMS value of the current waveform of the embodiment illustrated in FIG. 3B.

FIG. 9 illustrates yet another embodiment of a current waveform 689 that does not include step-changes in the current demand of a circuit (e.g., the circuit 565A) connected to a plurality of phases of a polyphase AC source. The waveform 689 includes the regions 695, 696, 697, and 698. The region 695 occurs from approximately 30 degrees to approximately 90 degrees. The region 696 occurs from approximately 90 degrees to approximately 150 degrees. The region 697 occurs from approximately 150 degrees to approximately 210 degrees. The region 698 occurs from approximately 210 degrees to approximately 270 degrees. According to one embodiment, the regions 696, 697 have non-linear slopes.

In the embodiment illustrated in FIG. 9, the current demand is controlled such that the current remains substantially constant in regions 695 and 698. In a version of this embodiment, the magnitude in the regions 695 and 698 is an amount that is 50% of the total current drawn from the line L1 (e.g., by the circuits 565A and 569A).

The embodiment illustrated in FIG. 9 provides an even more gradual transition at the point of the operating cycle where the circuit 565A stops drawing current from the line L1 and begins drawing current from the line L2 than the embodiment illustrated in FIG. 8. For example, in the region 696, the current drawn from the line L1 is gradually reduced to zero from the current level of the region 695. In the region 697, the current drawn from the line L2 is gradually increased from zero to the current level of the region 698.

As a result, the embodiment of FIG. 9 avoids a step-change in the current drawn from the line L1 by the circuit 565A at any of 30 degrees and 150 degrees. The embodiment of FIG. 9 also avoids a step-change in the current drawn from the line L2 by the circuit 565A at any of 150 degrees and 270 degrees. A further result of the approach shown in FIG. 9, is that the RMS value of current waveform 689 is approximately 75.2% of the RMS value of the current waveform of FIG. 3A. This is a slight increase as compared with the RMS values of the current waveforms of the embodiments illustrated in FIG. 3B and FIG. 8.

Although the embodiments illustrated in FIGS. 8 and 9 are described with reference to the operation of the circuit 565A, each of the circuits included in the polyphase power converters 202, 502, 702 can also be operated in a similar manner to eliminate step-changes in the current drawn by the circuits.

Figure 10:
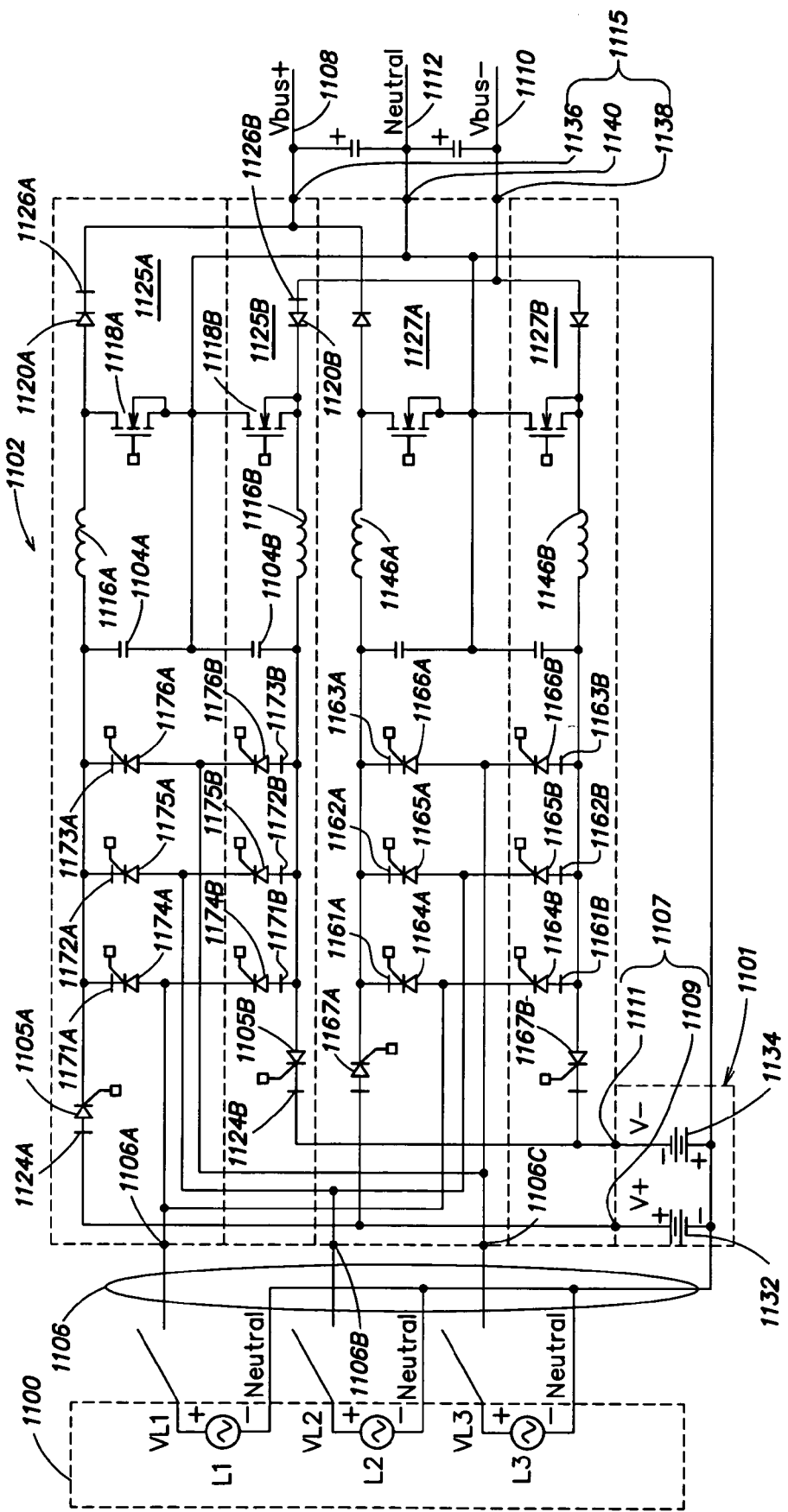
FIG. 10 is a schematic diagram of a power converter in accordance with a further embodiment of the invention.

Now referring to FIG. 10, yet another embodiment of a polyphase power converter 1102 is shown including a plurality of circuits connected to a plurality of phases of a polyphase AC source 1100. In one embodiment, the polyphase power converter 1102 includes a full bridge of controlled rectifiers connected to each pair of a plurality of circuits 1125A, 1125B and 1127A, 1127B, respectively.

According to one embodiment, each of the plurality of circuits 1125A, 1125B, 1127A, 1127B is connected to a plurality of phases of a polyphase AC source 1100. In one embodiment, each of the circuits is connected to each phase of the polyphase AC source 1100. According to one embodiment, switching devices are used to connect each of the line inputs of these circuits to a phase of the polyphase AC source 1100. In a version of this embodiment, the switching devices also operate as rectifiers.

Each of the plurality of circuits 1125A, 1125B, 1127A, 1127B can operate during a part of the line cycle of two or more phases of the polyphase AC source to increase the percentage of time that the circuit (e.g., 1125A, 1125B) can supply power from the polyphase AC source to the DC output (e.g., the positive DC output 1136, the negative DC output 1138) to which it is connected. Further, in one embodiment, operation of the switching devices allows each of the circuits 1125A, 1125B, 1127A, 1127B to draw current from any of the phase of the polyphase AC source 1100.

The polyphase power converter 1102 includes an AC input 1106 that includes inputs 1106A, 1106B, 1106C each connected to a phase of the polyphase AC source 1100. The AC input 1106 may also include a neutral. The polyphase power converter 1102 of FIG. 10 also includes a DC input 1107 and a DC output 1115. The DC input 1107 can include a positive DC input 1109, a negative DC input 1111. The DC input may also include a neutral input. The DC input 1107 is connected to a DC power source 1101. In a version of this embodiment, the positive DC input 1109 is connected to the DC power source 1101 at a positive DC terminal and the negative DC input 1111 is connected to the DC power source 1101 at a negative DC terminal. In the embodiment illustrated in FIG. 10, the DC power source 1101 includes a first battery 1132 and a second battery 1134.

The DC output 1115 can include a positive DC output 1136, a negative DC output 1138, and a neutral output 1140. In one embodiment, the positive DC output 1136 is connected to a positive DC bus 1108, the negative DC output 1138 is connected to a negative DC bus 1110, and the neutral output 1140 is connected to a neutral 1112.

In accordance with one embodiment, the polyphase power converter 1102 includes both a plurality of circuits (e.g., circuits 1125A, 1127A) that include positive boost circuits and a plurality of circuits (e.g., circuits 1125B, 127B) that include negative boost circuits. According to one embodiment, each of the circuits 1125A, 1127A (e.g., the positive boost circuits) include a first line input connected to a first phase of the polyphase AC source 1100, a second line input connected to a second phase of the polyphase AC source 1100, a third line input connected to a third phase of the polyphase AC source 1100, a DC input and a DC output. In this embodiment, each of the circuits 1125B, 1127B (e.g., the negative boost circuits) include a first line input connected to a first phase of the polyphase AC source 1100, a second line input connected to a second phase of the polyphase AC source 1100, a third line input connected to a third phase of the polyphase AC source 1100, a DC input and a DC output.

In one embodiment, the circuit 1125A includes a first switching device 1174A, a second switching device 1175A and a third switching device 1176A. In addition, the circuit 1125A includes a first line input 1171A, a second line input 1172A, a third line input 1173A, an inductor 1116A, a capacitor 1104A, a switch 1118A, a diode 1120A, and a SCR 1105A. The circuit 1125A also includes a DC input 1124A and a DC output 1126A. In one embodiment, the circuit 1125B includes a first switching device 1174B, a second switching device 1175B and a third switching device 1176B. In addition, the circuit 1125B includes a first line input 1171B, a second line input 1172B, a third line input 1173B, an inductor 1116B, a capacitor 1104B, a switch 1118B, a diode 1120B, and a SCR 1105B. The circuit 1125B also includes a DC input 1124B and a DC output 1126B.

The circuit 1127A includes a first switching device 1164A, a second switching device 1165A and a third switching device 1166A. In addition, the circuit 1127A includes a first line input 1161A, a second line input 1162A, a third line input 1163A, an inductor 1146A and a SCR 1167A. The circuit 1127B includes a first switching device 1164B, a second switching device 1165B and a third switching device 1166B. In addition, the circuit 1127B includes a first line input 1161B, a second line input 1162B, a third line input 1163B, an inductor 1146B and a SCR 1167B.

In the illustrated embodiment of each of the circuits (i.e., the circuits 1125A, 1125B, 1127A, 1127B), the first, second and third line inputs (e.g., the line inputs 1171A, 1172A, 1173A) are each connected to the corresponding line through a switching device (e.g., the switching device 1174A, 1175A, 1176A, respectively).

In one embodiment where the switching devices 1174A, 1175A, 1176A are controlled rectifiers, the circuit 1125A which includes a positive boost circuit is configured as follows: a first phase of the polyphase AC source is connected to an anode of the switching device 1174A; a cathode of the switching device 1174A is connected to the first line input 1171A; a second phase of the polyphase AC source is connected to an anode of the switching device 1175A; a cathode of the switching device 1175A is connected to the second line input 1172A; a third phase of the polyphase AC source is connected to an anode of the switching device 1176A; a cathode of the switching device 1176A is connected to the third line input 1173A; an anode of the SCR 1105A is connected to the DC input 1124A which is connected to the positive DC input 1109; a cathode of the SCR 1105A, the first line input 1171A, the second line input 1172A, the third line input 1173A, and a terminal of the capacitor 1104A are connected at the input side of the inductor 1116A; a second terminal of the capacitor 1104A is connected to the neutral 1112; the output side of the inductor 1116A is connected to a first terminal of the switch 1118A and to an anode of the diode 1120A; a second terminal of the switch 1118A is connected to the neutral 1112; a cathode of the diode 1120A is connected to the positive DC output 1126A which is connected to the DC output 1115 of the polyphase power converter 1102 at the positive DC output 1136.

The circuit 1127A which also includes a positive boost circuit is configured in a manner similar to the configuration of the circuit 1125A where the switching devices 1164A, 1165A, 1166A are controlled rectifiers. More specifically, an anode of the switching device 1164A is connected to the first phase of the polyphase AC source 1100, a cathode of the switching device 1164A is connected to a first line input 1161A, an anode of the switching device 1165A is connected to the second phase of the polyphase AC source 1100, a cathode of the switching device 1165A is connected to the second line input 1162A, an anode of the switching device 1166A is connected to the third phase of the polyphase AC source 1100; a cathode of the switching device 1166A is connected to a third line input 1163A; and each of the first line input 1161A, the second line input 1162A, and the third line input 1163A are connected to the input side of the inductor 1146A.

The circuit 1125B, which includes a negative boost circuit, is configured as follows where the switching devices 1174B, 1175B, 1176B are controlled rectifiers: the first phase of the polyphase AC source 1100 is connected to a cathode of the switching device 1174B; an anode of the switching device 1174B is connected to the first line input 1171B; the second phase of the polyphase AC source is connected to a cathode of the switching device 1175B; an anode of the switching device 1175B is connected to the second line input 1172B; the third phase of the polyphase AC source is connected to a cathode of the switching device 1176B; an anode of the switching device 1176B is connected to the third line input 1173B; a cathode of the SCR 1105B is connected to the DC input 1124B which is connected to the negative DC input 1111; an anode of the SCR 1105B, the first line input 1171B, the second line input 1172B, the third line input 1173B, and a terminal of the capacitor 1104B are connected at the input side of the inductor 1116B; a second terminal of the capacitor 1104B is connected to the neutral 1112; the output side of the inductor 1116B is connected to a first terminal of the switch 1118B and to a cathode of the diode 1120B; a second terminal of the switch 1118B is connected to the neutral 1112; an anode of the diode 1120B is connected to the positive DC output 1126B which is connected to the DC output 1115 of the polyphase power converter 1102 at the negative DC output 1138.

The circuit 1127B which also includes a negative boost circuit is configured in a manner similar to the configuration of the circuit 1125A. More specifically, a cathode of the switching device 1164B is connected to the first phase of the polyphase AC source 1100, an anode of the switching device 1164B is connected to a first line input 1161B, a cathode of the switching device 1165A is connected to the second phase of the polyphase AC source 1100, an anode of the switching device 1165B is connected to the second line input 1162A, a cathode of the switching device 1166B is connected to the third phase of the polyphase AC source 1100; an anode of the switching device 1166B is connected to a third line input 1163B; and each of the first line input 1161B, the second line input 1162B, and the third line input 1163B are connected to the input side of an inductor 1146B.

In accordance with one embodiment, each of the plurality of circuits 1725A, 1725B, 1727A, 1727B includes at least three operating sections that are employed together. One operating section controls the DC current drawn at the DC input (e.g., the DC input 1124A). This operating section includes the SCR (e.g., the SCR 1105A) which can be switched on and off to control the current drawn from the DC power source 1101. Another operating section includes the rectifier portion of the circuit which, in one embodiment, converts the sinusoidal AC signal supplied by the polyphase AC source 1100 to a half-wave rectified signal at the line inputs (e.g., the first, the second and the third line inputs 1171A, 1172A, 1173A, respectively). A third operating section includes the boost circuit that receives the rectified AC current at one of the first line input (e.g., the first line input 1171A), the second line input (e.g., the second line input 1172A), and the third line input (e.g., the third line input 1173A) and provides a DC signal at the DC output (e.g., the DC output 226A).

The operation of the circuits included in the polyphase power converter 1102 is controlled by a controller (not shown). According to one embodiment, the controller uses the information provided by the sensor to generate one or more switching signals that control the operation of the switches included in the circuit, for example, the switching devices 1174A, 1175A, 1176A, the SCR 1105A and the switch 1118A included in the circuit 1125A.

For the purpose of explaining the operation of some embodiments of the invention, the operation of the polyphase power converter 1102 is described with reference to a polyphase power converter connected to a three-phase AC source with lines L1, L2, and L3. In addition, the following description refers to a balanced, symmetrical three-phase system that includes a 120 degree phase displacement between the lines L1, L2, and L3. Embodiments of the invention can be employed in non-symmetrical systems, systems with a different phase displacement and those systems with an unbalanced voltage.

In addition, the following description refers to an embodiment where the combination of circuits 1125A, 1125B provide a first power factor correction circuit and the combination of circuits 1127A, 1127B provide a second power factor correction circuit. For example, in one embodiment, the circuit 1125A draws current during the positive portion of a single line cycle of a phase and the circuit 1125B draws current during the negative portion of the same line cycle of that phase. In some embodiments, the circuits 1125A, 1125B can draw current from any phase of the polyphase AC source 1100, however in those embodiments, the immediately-described relationship between the two circuits remains the same regardless of the phase from which current is drawn. The circuits 1127A and 1127B can operate together in a similar fashion.

Figure 11:
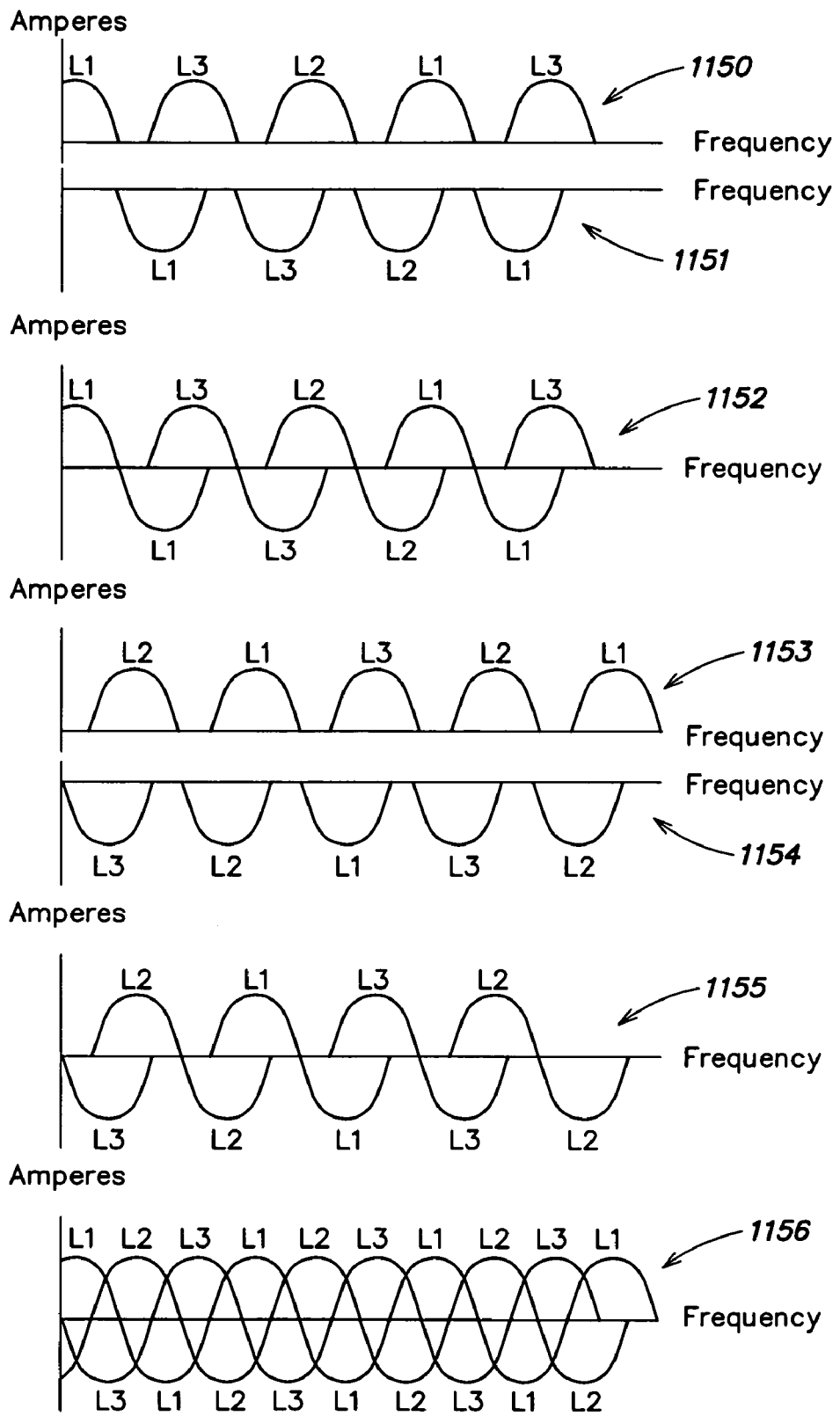
FIG. 11 illustrates plots of the current drawn by the power converter of FIG. 10 in accordance with an embodiment of the invention.

Referring to FIG. 11, waveform-plots are shown for the operation of the polyphase power converter 1102 of FIG. 10 where the waveform-plots illustrate current waveforms according to one embodiment.

As described above, the input side of the inductor is connected to each of the line inputs 1171A, 1172A, 1173A and each line input is connected to a phase of the polyphase AC source 1100 via the switching devices 1174A, 1175A, 1176A, respectively. Each of the switching devices may be turned on and off by the application of, for example, a trigger signal provided by the controller. Thus, the phase that the circuit 1125A is drawing current from at any instant in time can be controlled by switching on the appropriate switching device, i.e., turning on a controlled rectifier.

For example, the waveform 1150 illustrates the current supplied to the input side of the inductor 1116A of the circuit 1125A. As shown by the waveform 1150, current is initially drawn from line L1 by the circuit 1125A during a positive half-cycle. Following the negative zero crossing of the line L1, the circuit 1125A next draws current from the phase having the first positive zero crossing following that negative zero crossing of line L1, i.e., the line L3. Thus, the circuit 1125A stops drawing current at the negative zero crossing of the line L1 and begins drawing current again at the positive zero crossing of the line L3. The circuit 1125A continues to draw current from the line L3 until line L3 reaches its next negative zero crossing, i.e., for a full positive half-cycle of the line L3. At that time, the circuit 1125A stops drawing current until the next positive zero crossing of any phase, i.e., the positive zero crossing of the line L2. The circuit 1125A begins drawing current from the line L2 and continues to do so for a full positive half-cycle of the line L2. At that time, the circuit 1125A stops drawing current until the next positive zero crossing of any phase, i.e., the positive zero crossing of the line L1. At this time, the above-described operating cycle begins again.

The current drawn by the circuit 1125B which is connected to the negative DC output 1138 operates in a similar fashion during the negative half-cycles of the polyphase AC source 1100. The waveform 1151 illustrates current supplied to the input side of the inductor 1116B. For example, as shown by the waveform 1151, current is initially drawn from line L1 by the circuit 1125B during a negative half-cycle. Following the positive zero crossing of the line L1, the circuit 1125B next draws current from the phase having the first negative zero crossing following that positive zero crossing of line L1, i.e., the line L3. Thus, the circuit 1125B stops drawing current at the positive zero crossing of the line L1 and begins drawing current again at the negative zero crossing of the line L3. The circuit 1125B continues to draw current from the line L3 until line L3 reaches its next positive zero crossing, i.e., for a full negative half-cycle of the line L3. At that time, the circuit 1125B stops drawing current until the next negative zero crossing of any phase, i.e., the negative zero crossing of the line L2. The circuit 1125B begins drawing current from the line L2 and continues to do so for a full negative half-cycle of the line L2. At that time, the circuit 1125B stops drawing current until the next negative zero crossing of any phase, i.e., the negative zero crossing of the line L1. At this time, the above-described operating cycle begins again.

Operating together, the circuits 1125A and 1125B can draw current during complete line cycles of all three phases of the polyphase AC source 1100 with a substantially unity power factor. In one embodiment, the circuits 1125A and 1125B, in combination, draw current during every other complete line cycle of each phase of the polyphase AC source 1100. The waveform 1152 illustrates the total current drawn by the combination of the circuits 1125A, 1125B from the polyphase AC source 1100. As illustrated in waveform 1152, current is drawn by the circuits 1125A, 1125B for a first line cycle of the line L1, current is not drawn by the circuits 1125A, 1125B for the immediately following second line cycle of the line L1, and current is again drawn for a third line cycle of the line L1. The circuits 1125A, 1125B also draw current from the lines L2 and L3 in a similar fashion as illustrated in the waveform 1152.

As is described in greater detail below, in one embodiment, the combination of the circuits 1127A, 1127B draw current from each phase of the polyphase AC source 1100 for the alternate line cycles when current is not being drawn by the circuits 1125A, 1125B.

The waveforms 1153, 1154, and 1155 of FIG. 11 illustrate the current drawn by the circuits 1127A, 1127B. The waveform 1153 illustrates the current drawn by the circuit 1127A which supplies power to the positive DC output 1136. The circuit 1127A initially draws current from the line L2 during a positive half-cycle. Following the negative zero crossing of the line L2 at the end of the positive half-cycle, the circuit 1127A next draws current from the phase having the first positive zero crossing following that negative zero crossing of line L2, i.e., the line L1. Thus, the circuit 1125B stops drawing current at the negative zero crossing of the line L2 and begins drawing current again at the positive zero crossing of the line L1. The circuit 1127A continues to draw current from the line L1 until line L1 reaches its next negative zero crossing, i.e., for a full positive half-cycle of the line L1. At that time, the circuit 1125B stops drawing current until the next positive zero crossing of any phase, i.e., the positive zero crossing of the line L3. The circuit 1125B begins drawing current from the line L3 and continues to do so for a full positive half-cycle of the line L3. At that time, the circuit 1125B stops drawing current until the next positive zero crossing of any phase, i.e., the positive zero crossing of the line L2. At this time, the above-described operating cycle begins again.

The current drawn by the circuit 1127B which is connected to the negative DC output 1138 operates in a similar fashion during the negative half-cycles of the polyphase AC source 1100. For example, as shown by the waveform 1154, current is initially drawn from line L3 by the circuit 1127B during a negative half-cycle. Following the positive zero crossing of the line L3, the circuit 1127B next draws current from the phase having the first negative zero crossing following that positive zero crossing of line L3, i.e., the line L2. Thus, the circuit 1127B stops drawing current at the positive zero crossing of the line L3 and begins drawing current again at the negative zero crossing of the line L2. The circuit 1127B continues to draw current from the line L2 until line L2 reaches its next positive zero crossing, i.e., for a full negative half-cycle of the line L2. At that time, the circuit 1127B stops drawing current until the next negative zero crossing of any phase, i.e., the negative zero crossing of the line L1. The circuit 1127B begins drawing current from the line L1 and continues to do so for a full negative half-cycle of the line L1. At that time, the circuit 1127B stops drawing current until the next negative zero crossing of any phase, i.e., the negative zero crossing of the line L3. At this time, the above-described operating cycle begins again.

Operating together the circuits 1127A and 1127B can also draw current during complete line cycles of all three phases of the polyphase AC source 1100 with a substantially unity power factor. In one embodiment, the circuits 1127A and 1127B, in combination, draw current during every other complete line cycle of each phase of the polyphase AC source 1100, for example, during line cycles when the circuits 1125A, 1125B are not drawing current from a particular phase. The waveform 1155 illustrates the total current drawn by the combination of the circuits 1127A, 1127B from the polyphase AC source 1100. For example, as illustrated in waveform 1155, current is drawn by the circuits 1127A, 1127B for a first line cycle of the line L2, current is not drawn by the circuits 1227A, 1127B for the immediately following second line cycle of the line L2, but current is again drawn during a third line cycle of the line L2. The circuits 1127A, 1127B also draw current from the lines L1 and L3 in a similar fashion as illustrated in the waveform 1155.

As illustrated by the waveform 1156, in one embodiment, the total current drawn by the combination of circuits 1125A, 1125B, 1127A, 1127B results in a continuous current being drawn at a substantially unity power factor during all line cycles of the each phase of the polyphase AC source 1100.

In one embodiment, the topology of the polyphase power converter 1102 allows a reduction in the quantity of circuits that are employed in the polyphase power converter and a corresponding reduction in the quantity of components required by the polyphase power converter 1102 when compared with other topologies connected to a particular polyphase AC source.

In a further embodiment, the polyphase power converter 1102 achieves a total harmonic distortion of the line currents consistent with other topologies without requiring any additional filtering when compared with other topologies. In versions of this embodiment, the polyphase power converter 1102 achieves acceptable levels of total harmonic distortion while drawing a sinusoidal current from each phase of the polyphase AC source 1100 at a substantially unity power factor.

In one embodiment, the polyphase power converter 1102 includes a topology where the power rating of the circuits 1125A, 1125B, 1127A, 1127B is greater than the power ratings of circuits included in other polyphase power converter topologies. More specifically, in one embodiment, the power rating of the circuits 1125A, 1125B, 1127A, 1127B is between 20%-25% greater than the power rating of embodiments of the circuits included in other polyphase power converter topologies. In a version of this embodiment, the RMS current rating of the circuits 1125A, 1125B, 1127A, 1127B is 22% greater while the peak current remains the same when compared with embodiments of the prior art polyphase power converter of FIG. 1 where the power ratings are compared based on the RMS currents of the circuits.

In one embodiment, the power ratings of the circuits 1125A, 1125B, 1127A, 1127B are 70% greater than the power ratings of the circuits included in embodiments of the polyphase power converters 202, 502 where the power ratings are compared based on the RMS currents of each circuit.

Thus far, operation of the polyphase power converter 1102 of FIG. 10 has been described with reference to periods when the converter draws power from the polyphase AC source 1100. According to one embodiment, the polyphase power converter 1102 can also draw DC power from the DC power source 1101 either when the polyphase AC source 1100 is unavailable or in combination with the current drawn from the polyphase AC source. Unlike the embodiments described thus far, however, in one embodiment, the individual circuits (e.g., the circuit 1125A) do not each draw current alternatively from the DC power source 1101 and from the polyphase AC source 1100. For example, when the circuit 1125A draws current from the polyphase AC source 1100 as shown in the waveform 1150 of FIG. 11, DC power is not drawn from the DC power source 1101 during periods when the circuit 1125A is not drawing power, i.e., the period beginning with the first negative zero crossing of the line L1 and ending with the positive zero crossing of the line L3, the period beginning with the negative zero crossing of the line L3 and ending with the first positive zero crossing of the line L2, etc.

In one embodiment, where it is desired to supplement the AC power drawn from the polyphase AC source 1100 with power drawn from the DC power source 1101, a first pair of circuits (e.g., circuits 1125A, 1125B) draws power from the polyphase AC source 1100 and a second pair of circuits (e.g., circuits 1127A, 1127B) draws power from the DC power source 1101. For example, the switching devices (e.g., 1174A, 1174B) in each of the circuits 1125A and 1125B can be turned on together. The resulting operation of the circuits 1125A, 1125B is similar to that of a polyphase full wave rectifier bridge such that a continuous current is drawn at a substantially unity power factor during all line cycles of the each phase of the polyphase AC source 1100. While the circuits 1125A, 1125B are drawing power from the polyphase AC source 1100, the switching devices (e.g., 1164A, 1164B) in each of the circuits 1127A, 1127B can be turned off to isolate each of the line inputs (e.g., 1161A, 1161B) from the polyphase AC source 1100. In this operating mode, the SCRs 1167A, 1167B that connect the circuits 1127A, 1127B, respectively, to the DC power source 1101 are turned on to allow the circuits 1127A, 1127B to draw power from the DC power source 1101.

The operation described above allows power to be supplied to the DC output 1115 simultaneously from each of the polyphase AC source 1100 and the DC power source 1101. That is, power can be supplied to the DC output 1115 from the polyphase AC source 1100 by the circuits 1125A and 1125B while power is supplied to the DC output 1115 from the DC power source 1101 by the circuits 1127A and 1127B. Further, the above-described operation also allows the polyphase power converter 1102 to, for example, gradually increase the amount of power drawn from the polyphase AC source 1100 when the polyphase power converter 1102 returns to full AC operation after previously operating with at least some portion of power supplied from the DC power source.

Figure 12:
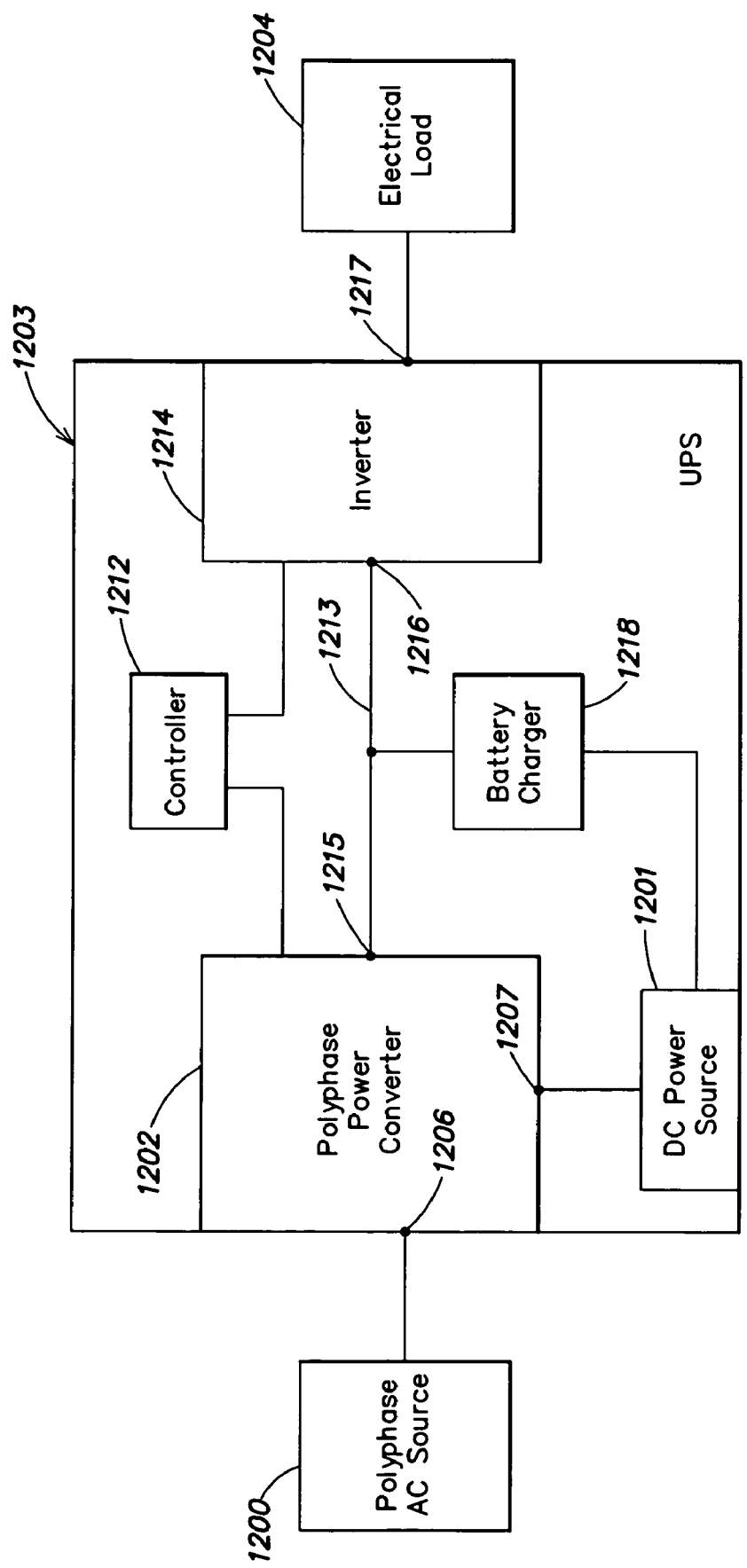
FIG. 12 is a block diagram of a UPS employing a power converter in accordance with one embodiment of the invention.

Embodiments of each of the polyphase power converters 202, 502, 702, 1102 described above can be employed in a variety of applications. For example, embodiments of each polyphase power converter 202, 502, 702, 1102 can be employed in a UPS. FIG. 12 illustrates one general approach to employing a polyphase power converter in a UPS according to embodiments of the invention. In FIG. 12, a polyphase AC source 1200 supplies AC power to a UPS 1203 which supplies AC power to electrical load 1204. According to one embodiment, the UPS 1203 includes a polyphase power converter 1202, an inverter 1214, a controller 1212, a DC link 1213, and a DC power source 1201. Further, in one embodiment, where the DC power source 1201 includes a battery, the UPS 1203 includes a battery charger 1218.

In various embodiments, the polyphase power converter 1202 is an embodiment of one of the polyphase power converters described with reference to FIGS. 2, 5, 7 and 10. The polyphase power converter 1202 includes an AC input 1206 which may include a plurality of phases and a neutral, a DC input 1207 and a DC output 1215. The inverter 1214 includes a DC input 1216 and an AC output 1217. The DC link 1213 connects the DC output 1215 of the polyphase power converter 1202 to the DC input 1216 of the inverter 1214. The AC output 1217 of the inverter is connected to the electrical load 1204.

In one embodiment, the UPS 1203 receives polyphase AC power from the AC source 1200 at the AC input 1206. The polyphase power converter 1202 draws power from the polyphase AC source 1200 at a substantially unity power factor to meet the demands of the electrical load 1204. The polyphase power converter 1202 converts the AC power to DC at the DC output 1215 and the DC power is transmitted to the DC input of the inverter 1216 by the DC link 1213. The DC link 1213 may be any conductor or group of conductors, for example, a DC bus, that can carry the DC power from the power converter 1202 to the inverter 1214. The inverter 1214 converts the DC power to polyphase AC power at the AC output 1217 where it is supplied to the electrical load 1204.

According to one embodiment, the DC power source 1201 supplies DC power to the polyphase power converter 1202 during periods when the polyphase AC source is unavailable and periods when the electrical demand of the electrical load 1204 would otherwise overload the polyphase AC source 1200.

Embodiments of the UPS 1203 can include one or more controllers 1212 to control operation of the polyphase power converter 1202 and the inverter 1214. For example, the controller 1212 may provide a reference waveform to each of the circuits (e.g., 225A, 565A, 785A, 785A, 1125A) to control the current drawn by each circuit from the polyphase AC source. According to one embodiment, the controller 1212 includes a digital signal processor. As mentioned above, the controller 1212 can also control the operation of the inverter 1214. As a result, in one or more embodiments, the controller 1212 controls the conversion of DC power supplied to the inverter 1214 by the DC link 1213 to AC power at the output 1217. According to some embodiments a first controller is used to control operation of the polyphase power converter 1202 and a second controller is used to control operation of the inverter 1214. In addition, the first controller can include a plurality of controllers and the second controller can also include a plurality of controllers.

In various embodiments, the operation of the circuits included in the polyphase power converters 202, 502, 702, 1102 are also controlled by the controller 1212 which may include an electronic control circuit which may be an analog circuit, a digital circuit, or a combination of analog and digital circuits. In some embodiments, the controller includes at least one digital signal processor (e.g., a microprocessor). Further, a single controller or a plurality of controllers may be used to control the operation of the plurality of circuits, e.g., the circuits 225A/225B, 565A/565B, 785A/785B, 1125A/1125B.

At least one sensor (e.g., a current sensor) is included with each of the plurality of circuits (e.g., the circuits 225A, 565A, 785A, 1125A) to provide a signal indicative of the actual current being drawn by the circuit. The controller 1212 uses the information provided by the sensor to generate one or more switching signals that control the operation of the switches included in the circuit, for example, the switching device 781, the SCR 705A and the switch 718A included in the circuit 785A. According to one embodiment, the controller compares the actual current with a reference waveform and controls the operation of the switches in the circuit to closely match the actual current drawn to the reference waveform.

In general, the controller 1212 controls operation of the circuits so that they draw a sinusoidal current from the polyphase AC source at a substantially unity power factor. During operation on the DC power source, the controller 1212 controls the circuits to boost the voltage supplied by the DC power source.

Embodiments of polyphase power converters (e.g., 202, 502, 702, 1102) can be employed with any polyphase AC source including any quantity of phases. Further, embodiments of the polyphase power converters 202, 502, 702, 1102 can be employed with polyphase AC sources that do not include a neutral. In addition, the capacitors (e.g., 204A, 504A, 704A, 1104A) can be included in the individual circuits (e.g., 225A, 565A, 785A, 1125A) as described previously or a single capacitance can be included at each of the AC inputs (e.g., 1106A, 1106B, 1106C) to provide line filtering that reduces or eliminates noise generated by the polyphase power converter on the AC lines.

In any of the preceding embodiments, the polyphase power converter can be bi-directional. For example, referring to FIG. 12, a DC power source may be connected to the DC link 1213 such that in one stage of operation DC power supplied to the DC output 1215 is converted to AC by the polyphase power converter 1202 at the AC input 1206.

In any of the preceding embodiments, the DC power source (e.g., the DC power source 201, 501, and 601) can be any of batteries, fuel cells, photovoltaic power sources, and DC micro turbines. It should be recognized that the DC power source is not limited to the preceding and may be another source of DC power, any combination of the preceding DC power sources, or a combination of any of the preceding and other DC power sources.

In one or more of the preceding embodiments, the first and second rectifiers (e.g., rectifiers 203A, 203B) are diodes. In any of the preceding embodiments, however, they may be any device that can conduct current during a portion of an AC line cycle. Also, the SCRs (e.g., the SCRs 205A, 205B) may be any switching device that allows the controlled application of DC current from a DC power source (e.g., the DC power source 201).

In any of the preceding embodiments, the switches (i.e., switches 218A, 218B, 518A, 518B, 718A, 718B, 1118A, 1118B) may be any switching device that allows the controlled connection of the inductor (e.g., inductor 216A) to the neutral (e.g., neutral 212). In various embodiments, the switches (i.e., switches 218A, 218B, 518A, 518B, 718A, 718B, 1118A, 1118B) are field effect transistors (e.g., a MOSFET) while in other embodiments the switches are insulated gate bipolar transistors (i.e., an IGBT).

The switching devices (e.g., 560, 781A, 1174A) can be any electronic device or electromechanical switching device that can isolate a conductive path, i.e., render the conductive path non-conductive. As indicated above, in some embodiments, the switching device includes a rectifier, for example, a controlled rectifier that can be turned on and off with the application of a control signal, e.g., an SCR, a thyristor, etc.

In some embodiments, the circuits (e.g., 225A, 565A, 785A, 1125A) each include a boost circuit while in other embodiments the circuits each include a buck-boost circuit.

As mentioned herein, embodiments of the invention can provide a power converter that has reduced losses compared with prior art power converters providing an equal power output. In addition, embodiments of the invention, can also provide increased power output with losses equivalent to those of a prior art power converter operating at a lower power output. According to one embodiment losses are reduced by approximately 20% when compared with prior art power converters. In one version of this embodiment, the efficiency is improved from approximately 97.5% to 98% efficiency. Further, where an embodiment of the power converter is included in a UPS, the overall UPS efficiency can be increased to approximately 96%.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A polyphase power converter comprising:
   an input adapted to couple to a polyphase AC source;
   a DC output having a positive DC bus, a negative DC bus and a neutral bus;
   a first power converter circuit adapted to receive a first combination of phases of the polyphase AC source and a neutral and to produce a DC voltage at the positive DC bus; and
   a second power converter circuit adapted to receive a second combination of phases of the polyphase AC source and the neutral and to produce a DC voltage at the positive DC bus,
   wherein the first combination and the second combination are different combinations of phases of the polyphase AC source.

2. The polyphase power converter of claim 1, wherein each of the first power converter circuit and the second power converter circuit is adapted to receive DC power.

3. The polyphase power converter of claim 1, further comprising a neutral input and a neutral output, wherein the neutral input and the neutral output are connected to one another.

4. The polyphase power converter of claim 3, wherein the positive DC bus, the negative DC bus, and the neutral bus are adapted to be coupled to an inverter.

5. The polyphase power converter of claim 4, wherein the polyphase power converter is included in an uninterruptible power supply.

6. The polyphase power converter of claim 1, further comprising a plurality of switching devices, wherein each of the plurality of switching devices is adapted to isolate at least one phase of the polyphase AC source from at least one of the first power converter circuit and the second power converter circuit.

7. The polyphase power converter of claim 6, wherein the first power converter circuit and the second power converter circuit each include a separate plurality of inputs including a first input adapted to couple to a first phase of the polyphase AC source and a second input adapted to couple to a second phase of the polyphase AC source.

8. The polyphase power converter of claim 7, wherein the first input and the second input of each of the first power converter circuit and the second power converter circuit are adapted to be coupled to the polyphase AC source by a separate controlled rectifier.

9. The polyphase power converter of claim 7, wherein the first power converter circuit comprises a positive boost circuit, and wherein the second power converter circuit comprises a positive boost circuit.

10. The polyphase power converter of claim 7, wherein a first switching device is adapted to isolate the first input of the first power converter circuit from the first phase, and wherein a second switching device is adapted to isolate the first input of the second power converter circuit from the second phase.

11. The polyphase power converter of claim 7, wherein a first switching device is adapted to isolate each of the first input of the first power converter circuit and the first input of the second power converter circuit from the first phase.

12. The polyphase power converter of claim 11, wherein the first switching device comprises a relay.

13. The polyphase power converter of claim 1, further comprising:
a third power converter circuit adapted to receive the first combination of phases of the polyphase AC source and a neutral and to produce a DC voltage at the negative DC bus; and
a fourth power converter circuit adapted to receive the second combination of phases of the polyphase AC source and a neutral and to produce a DC voltage at the negative DC bus.

14. A method of converting a polyphase AC input to a DC output including a positive DC bus, a negative DC bus and a neutral bus, the method comprising acts of:
coupling a first power converter circuit to a first combination of phases and a neutral of the polyphase AC input;
coupling a second power converter circuit to a second combination of phases and the neutral of the polyphase AC input;
coupling an output of the first power converter circuit to the positive DC bus and the neutral bus; and
coupling an output of the second power converter circuit to the positive DC bus and the neutral bus,
wherein each of the first power converter circuit and the second power converter circuit is coupled to the neutral and to a different combination of phases of the polyphase AC source.

15. The method of claim 14, further comprising acts of:
isolating a first phase of the polyphase AC source from the first power converter circuit with a first switching device; and
isolating a second phase of the polyphase AC source from the second power converter circuit with a second switching device.

16. The method of claim 15, wherein the first switching device comprises a first controlled rectifier, and wherein the second switching device comprises a second controlled rectifier.

17. The method of claim 14, further comprising acts of
coupling a total of three or more power converter circuits to the polyphase AC input, wherein each of the three or more power converter circuits is coupled to the neutral and to a different combination of phases of the polyphase AC source; and
coupling an output of each of the three or more power converter circuits to the positive DC bus and to the neutral bus.

18. The method of claim 14, further comprising an act of isolating a phase of the polyphase AC source from each of the first power converter circuit and the second power converter circuit with a switching device.

19. The method of claim 18, wherein the switching device is a relay.

20. The method of claim 14, further comprising acts of:
coupling a third power converter circuit to the first combination of phases and the neutral of the polyphase AC input;
coupling a fourth power converter circuit to the second combination of phases and the neutral of the polyphase AC input;
coupling an output of the third power converter circuit to the negative DC bus and the neutral bus; and
coupling an output of the fourth power converter circuit to the negative DC bus and the neutral bus.

21. The method of claim 14, further comprising an act of simultaneously drawing power from a phase of the polyphase AC input by both the first power converter circuit and the second power converter circuit for at least a part of a line cycle of the polyphase AC input.

22. The method of claim 21, further comprising an act of simultaneously drawing power from the phase of the polyphase AC input by both the first power converter circuit and the second power converter circuit for a majority of the line cycle of the polyphase AC input.

23. The method of claim 14, further comprising an act of including a boost circuit in at least one of the first power converter circuit and the second power converter circuit.

24. A polyphase power converter comprising:
an input adapted to couple to a polyphase AC source;
a DC output having a positive DC bus, a negative DC bus, and a neutral bus;
a first power converter circuit with means for receiving a first combination of phases of the polyphase AC source and a neutral, wherein the first power converter circuit is adapted to produce a DC voltage at the positive DC bus; and
a second power converter circuit with means for receiving a second combination of phases of the polyphase AC source and the neutral, wherein the second power converter circuit is adapted to produce a DC voltage at the positive DC bus,
wherein the first combination and the second combination are different combinations of phases of the polyphase AC source.

25. The polyphase power converter of claim 24, further comprising switching means adapted to isolate at least one phase of the polyphase AC source from at least one of the first power converter circuit and the second power converter circuit.

26. The polyphase power converter of claim 24, wherein each of the means for receiving the first combination and the means for receiving the second combination include means to rectify an AC signal supplied by the polyphase AC source.

27. The polyphase power converter of claim 24, wherein each of the means for receiving the first combination and the means for receiving the second combination include switching means adapted to isolate at least one phase of the polyphase AC source from the first power converter circuit and the second power converter circuit, respectively.

28. The polyphase power converter of claim 27, wherein each of the means for receiving the first combination and the means for receiving the second combination include a silicon controlled rectifier.

29. The polyphase power converter of claim 28, wherein each of the means for receiving the first combination and the means for receiving the second combination include a first input adapted to be coupled to a first phase of the polyphase AC source by a first silicon controlled rectifier and a second input adapted to be coupled to the second phase of the polyphase AC source by a second silicon controlled rectifier.

30. The polyphase power converter of claim 24, wherein each of the means for receiving the first combination and the means for receiving the second combination include a relay.

31. The polyphase power converter of claim 24, wherein the first power converter circuit includes a first boost circuit, and wherein the second power converter circuit includes a second boost circuit.

32. A method of converting a polyphase AC input to a DC output, the method comprising acts of:
  coupling a first power converter circuit to a first combination of phases of the polyphase AC input;
  coupling a second power converter circuit to a second combination of phases of the polyphase AC input;
  coupling an output of the first power converter circuit to the DC output;
  coupling an output of the second power converter circuit to the DC output;
  coupling a total of three or more power converter circuits to the polyphase AC input, wherein each of the power converter circuits is coupled to a different combination of phases of the polyphase AC source wherein the first power converter circuit comprises a first boost circuit having a first input, wherein the second power converter circuit comprises a second boost circuit having a second input, and wherein a third power converter circuit comprises a third boost circuit having a third input;
  coupling an output of each of the three or more power converter circuits to the DC output;
  isolating the first input during a first part of a line cycle of the polyphase AC input;
  isolating the second input during a second part of the line cycle; and
  isolating the third input during a third part of the line cycle.

33. The method of claim 32, further comprising an act of coupling the first input and the second input to a phase of the polyphase AC input during a fourth part of the line cycle.

34. The method of claim 33, wherein the first boost circuit is a first positive boost circuit, and wherein the second boost circuit is a second positive boost circuit.

35. A polyphase UPS comprising:
  a first input adapted to couple to a polyphase AC source including a neutral;
  a positive DC output;
  a negative DC output;
  a first plurality of power converter circuits each adapted to receive a plurality of phases of the polyphase AC source and the neutral and to provide a DC signal to the positive DC output;
  a second plurality of power converter circuits each adapted to receive a plurality of phases of the polyphase AC source and the neutral and to provide a DC signal to the negative DC output; and
  a second input adapted to be coupled to a DC power source, wherein each of the first plurality of power converter circuits is adapted to receive a different combination of phases than others of the first plurality of power converter circuits, and wherein each of the second plurality of power converter circuits is adapted to receive a different combination of phases than others of the second plurality of power converter circuits.

36. The UPS of claim 35, further comprising a neutral output and an inverter, wherein the positive DC output, the negative DC output, and the neutral output are adapted to be coupled to the inverter.

37. The UPS of claim 35, wherein the first plurality of power converter circuits each include a positive boost circuit, respectively, and wherein the second plurality of power converter circuits each include a negative boost circuit, respectively.

38. The UPS of claim 37, wherein each of the positive boost circuits include a first input adapted to receive a rectified signal from a first phase of the polyphase AC source, and a second input adapted to receive a rectified signal from a second phase of the polyphase AC source.

39. The UPS of claim 38, wherein the first input of each the positive boost circuits is adapted to be coupled to the first phase of the polyphase AC source by a first silicon controlled rectifier, and wherein the second input of each the positive boost circuits is adapted to be coupled to the second phase of the polyphase AC source by a second silicon controlled rectifier, and wherein a separate first silicon controlled rectifier and a separate second silicon controlled rectifier are employed with each of the positive boost circuits, respectively.

40. The UPS of claim 37, wherein each positive boost circuit is adapted to receive a rectified signal from each phase of the polyphase AC source, and wherein each negative boost circuit is adapted to receive a rectified signal from each phase of the polyphase AC source.

41. The UPS of claim 37, further comprising a plurality of switching devices, wherein each of the plurality of switching devices is adapted to isolate at least one phase of the polyphase AC source from one positive boost circuit and one negative boost circuits.

42. The UPS of claim 41, wherein each of the plurality of switching devices comprises a relay.

43. The UPS of claim 35, wherein the UPS includes the DC power source, and wherein the DC power source is a battery power source.

* * * * *

UNITED STATES PATENT AND TRADEMARK OFFICE
CERTIFICATE OF CORRECTION

| | | |
|---|---|---|
| PATENT NO. | : 7,456,524 B2 | Page 1 of 1 |
| APPLICATION NO. | : 11/394926 | |
| DATED | : November 25, 2008 | |
| INVENTOR(S) | : Henning Roar Nielsen et al. | |

It is certified that error appears in the above-identified patent and that said Letters Patent is hereby corrected as shown below:

In the claims:
Column 46, Claim 41, line 45, delete "circuits" replace with "circuit".

Signed and Sealed this

Twenty-ninth Day of September, 2009

David J. Kappos
*Director of the United States Patent and Trademark Office*